United States Patent
Hino et al.

(10) Patent No.: US 10,819,175 B2
(45) Date of Patent: Oct. 27, 2020

(54) ROTATING ELECTRIC MACHINE AND ROTATING ELECTRIC MACHINE MANUFACTURING METHOD

(71) Applicant: Mitsubishi Electric Corporation, Chiyoda-ku, Tokyo (JP)

(72) Inventors: Tatsuro Hino, Tokyo (JP); Kohei Egashira, Tokyo (JP); Tetsuya Yokogawa, Tokyo (JP); Hiroyuki Akita, Tokyo (JP); Akira Hashimoto, Tokyo (JP); Masashi Nakamura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 477 days.

(21) Appl. No.: 15/556,915

(22) PCT Filed: May 17, 2016

(86) PCT No.: PCT/JP2016/064558
§ 371 (c)(1),
(2) Date: Sep. 8, 2017

(87) PCT Pub. No.: WO2016/190161
PCT Pub. Date: Dec. 1, 2016

(65) Prior Publication Data
US 2018/0054103 A1 Feb. 22, 2018

(30) Foreign Application Priority Data
May 22, 2015 (JP) ................................. 2015-104072

(51) Int. Cl.
*H02K 1/16* (2006.01)
*H02K 3/12* (2006.01)
(Continued)

(52) U.S. Cl.
CPC ............... *H02K 3/28* (2013.01); *H02K 1/148* (2013.01); *H02K 3/12* (2013.01); *H02K 3/18* (2013.01);
(Continued)

(58) Field of Classification Search
CPC .......... H02K 1/146; H02K 1/148; H02K 3/12; H02K 3/18; H02K 3/28; H02K 3/345;
(Continued)

(56) References Cited

U.S. PATENT DOCUMENTS 6,455,972 B1 * 9/2002 Asao ........................ H02K 3/12
310/184
2004/0061400 A1 * 4/2004 Fukushima ............... H02K 3/28
310/184

(Continued)

FOREIGN PATENT DOCUMENTS

EP 1 109 285 A2 6/2001
EP 1 109 287 A2 6/2001
(Continued)

OTHER PUBLICATIONS

International Search Report (PCT/ISA/210) dated Aug. 9, 2016, by the Japanese Patent Office as the International Searching Authority for International Application No. PCT/JP2016/064558.
(Continued)

*Primary Examiner* — Jue Zhang
*Assistant Examiner* — David A. Singh
(74) *Attorney, Agent, or Firm* — Buchanan Ingersoll & Rooney PC

(57) ABSTRACT

A unit coil includes: first, second, third, and fourth turn portions extending in a bent manner from first, second, third, and fourth slot accommodation portions and each connecting the slot accommodation portions to each other; and first, second, third, and fourth leg portions. Recesses are formed
(Continued)

in surfaces opposed to each other at bent parts of the turn portions or bent parts of the turn portion and the leg portion, that extend in a bent manner toward the same side in the circumferential direction from the slot accommodation portions adjacent to each other in the radial direction.

8 Claims, 31 Drawing Sheets

(51) Int. Cl.
*H02K 15/02* (2006.01)
*H02K 15/06* (2006.01)
*H02K 3/28* (2006.01)
*H02K 1/14* (2006.01)
*H02K 3/18* (2006.01)
*H02K 3/34* (2006.01)

(52) U.S. Cl.
CPC ........... *H02K 3/345* (2013.01); *H02K 15/024* (2013.01); *H02K 15/06* (2013.01); *H02K 15/064* (2013.01); *H02K 1/165* (2013.01); *H02K 15/066* (2013.01)

(58) Field of Classification Search
CPC ........ H02K 3/50; H02K 3/505; H02K 15/024; H02K 15/026; H02K 15/0421; H02K 15/0464; H02K 15/06; H02K 15/064; H02K 15/066; H02K 15/085; H02K 1/16; H02K 1/165
USPC .................................................. 310/201–207
See application file for complete search history.

(56) References Cited

U.S. PATENT DOCUMENTS

| | | | |
|---|---|---|---|
| 2005/0258703 A1 | 11/2005 | Kouda et al. | |
| 2008/0061659 A1* | 3/2008 | Nakamura | H02K 11/046 310/68 D |
| 2008/0148551 A1* | 6/2008 | Hara | H02K 15/0081 29/596 |
| 2010/0187938 A1 | 7/2010 | Yamamoto et al. | |
| 2011/0025164 A1* | 2/2011 | Tanaka | H02K 3/12 310/206 |
| 2012/0169163 A1* | 7/2012 | Imai | H02K 1/2746 310/71 |
| 2014/0021823 A1* | 1/2014 | Kitamura | H02K 3/14 310/208 |
| 2015/0155750 A1* | 6/2015 | Hashimoto | H02K 1/02 310/43 |
| 2015/0162787 A1* | 6/2015 | Sakaue | H02K 15/04 310/195 |
| 2015/0229189 A1* | 8/2015 | Tsuiki | H02K 3/12 29/596 |
| 2015/0381001 A1* | 12/2015 | Tsuiki | H02K 3/28 310/208 |
| 2016/0156238 A1* | 6/2016 | Tsuiki | H02K 3/12 |
| 2017/0141632 A1* | 5/2017 | Hashimoto | H02K 15/0435 |
| 2018/0069446 A1* | 3/2018 | Hino | H02K 1/16 |

FOREIGN PATENT DOCUMENTS

| | | |
|---|---|---|
| EP | 1 109 289 A2 | 6/2001 |
| EP | 1 109 290 A2 | 6/2001 |
| EP | 1 109 291 A2 | 6/2001 |
| EP | 1 109 292 A2 | 6/2001 |
| EP | 1 109 293 A2 | 6/2001 |
| EP | 1 109 294 A2 | 6/2001 |
| EP | 1 109 295 A2 | 6/2001 |
| EP | 1 109 296 A2 | 6/2001 |
| EP | 1109 286 A2 | 6/2001 |
| JP | 11-98744 A | 4/1999 |
| JP | 2001-178054 A | 6/2001 |
| JP | 2005-130645 A | 5/2005 |
| JP | 2005-341656 A | 8/2005 |
| JP | 4186872 B2 | 11/2008 |
| WO | WO 2010/087078 A1 | 8/2010 |

OTHER PUBLICATIONS

Written Opinion (PCT/ISA/237) dated Aug. 9, 2016, by the Japanese Patent Office as the International Searching Authority for International Application No. PCT/JP2016/064558.

Office Action dated Nov. 1, 2018, by the Chinese Patent Office in corresponding Chinese Patent Application No. 201680015382.2 and English translation of the Office Action. (24 pages).

\* cited by examiner

FIG. 4
(a)
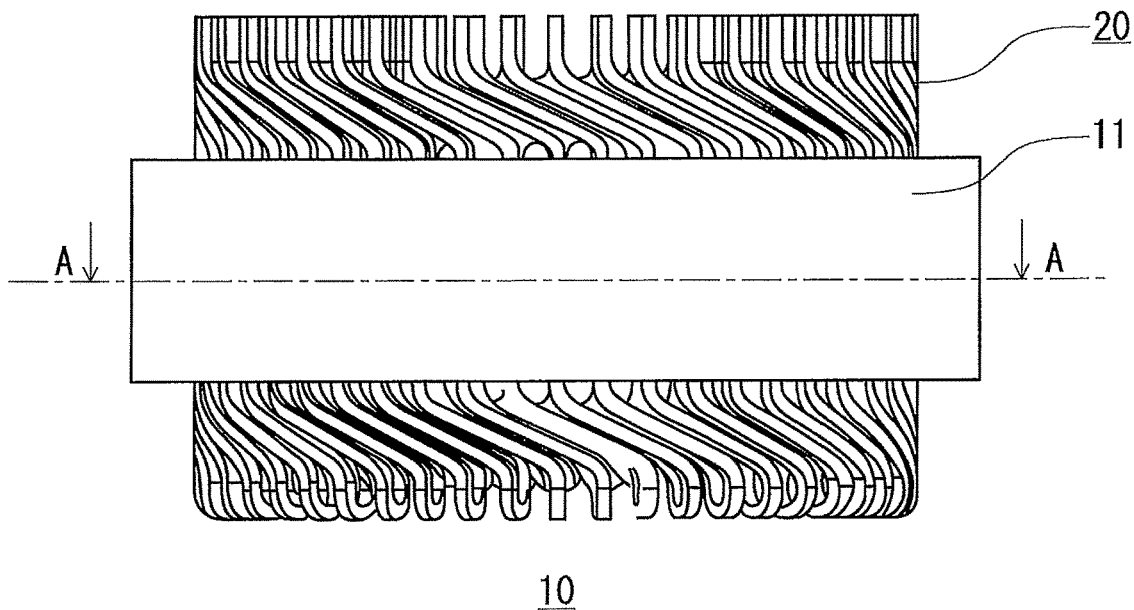
(b)
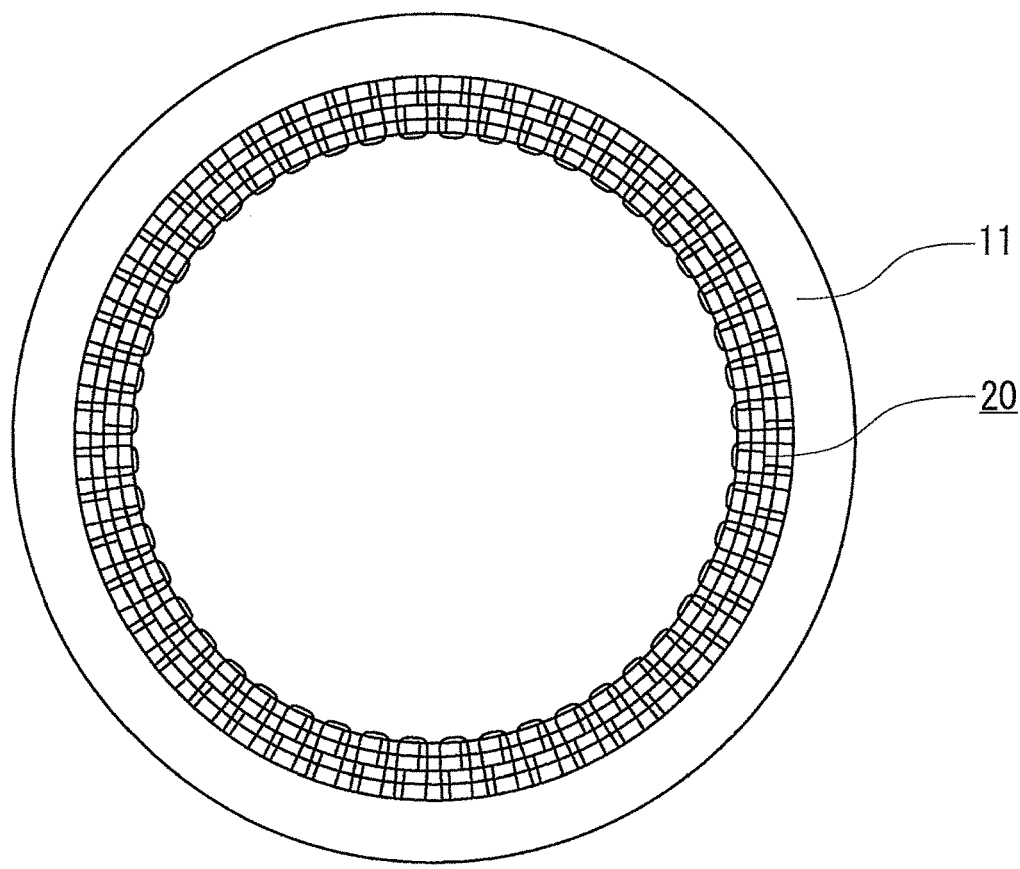

FIG. 11 (a)
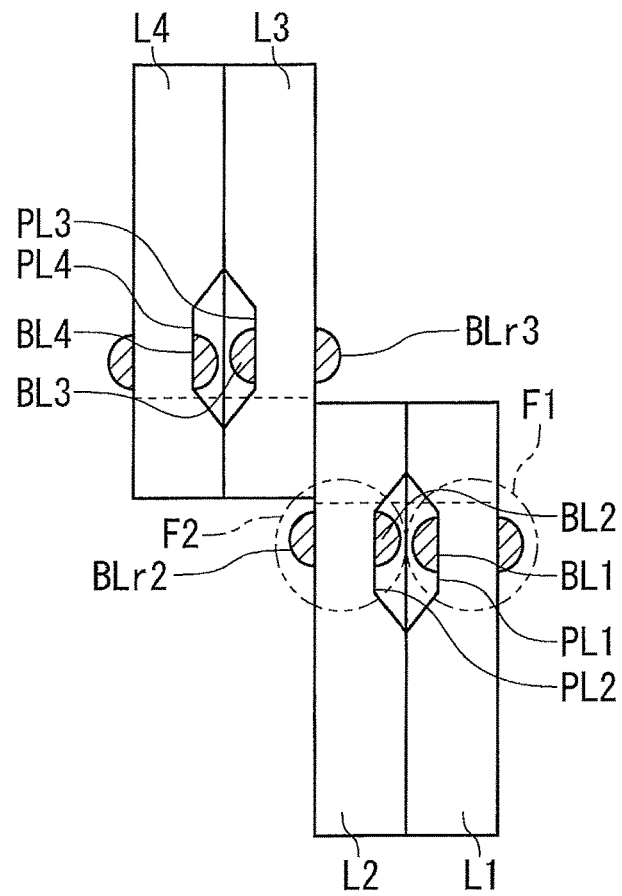
(b)
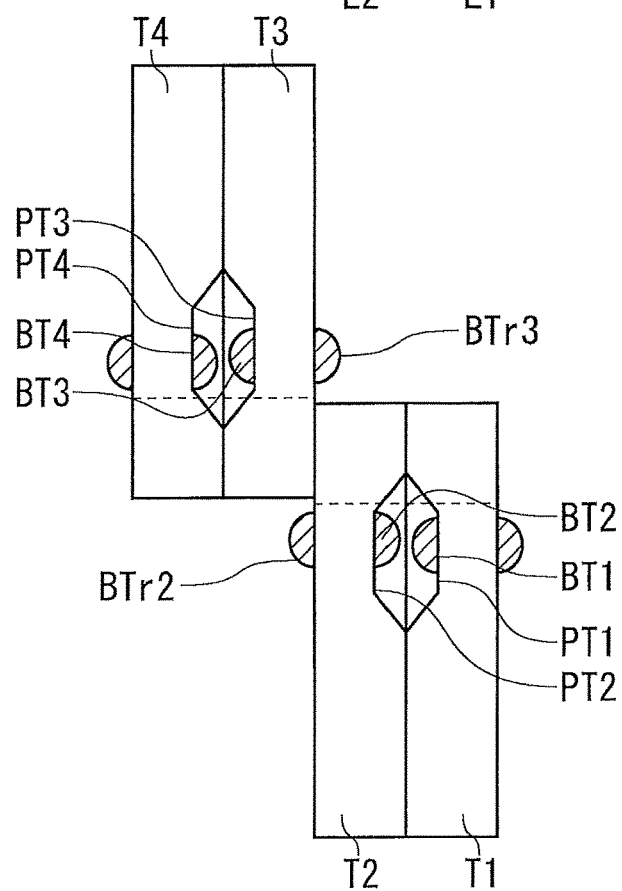

FIG. 13 (a)
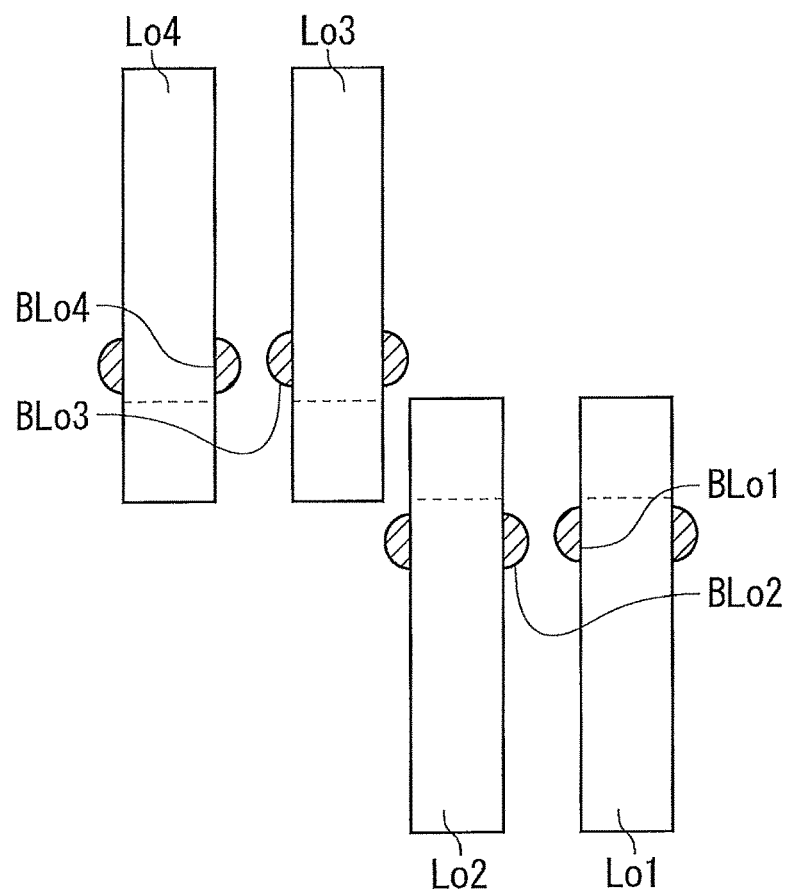
(b)
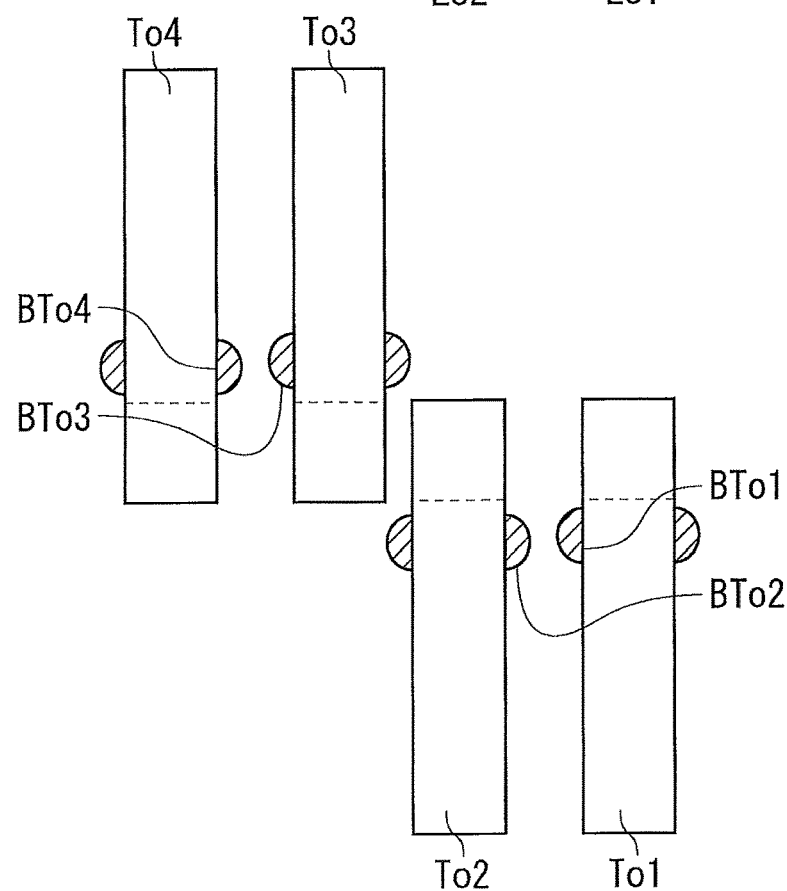

FIG. 14
(a)
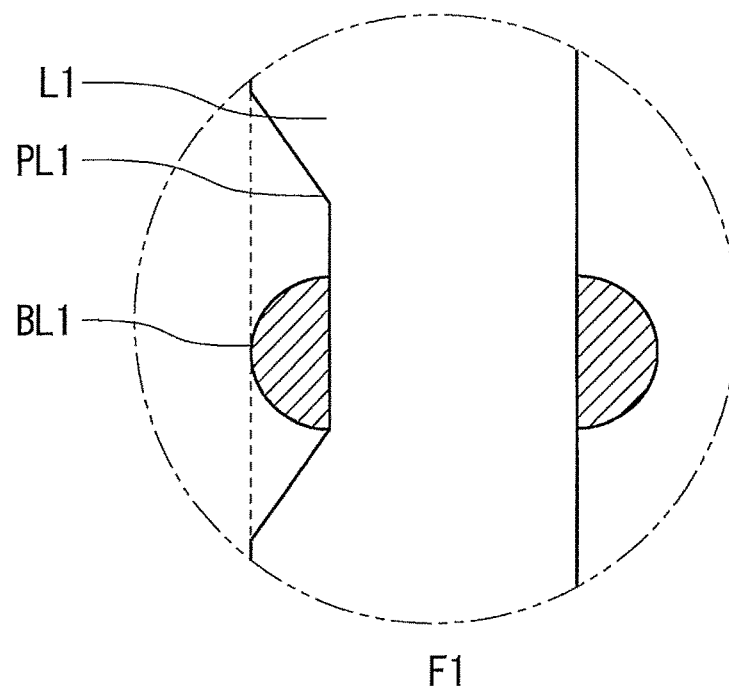
F1
(b)
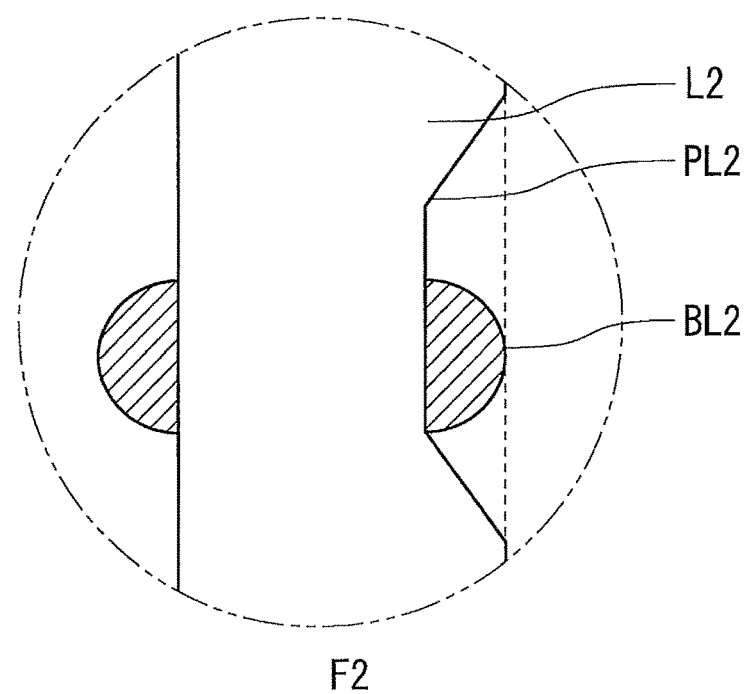
F2

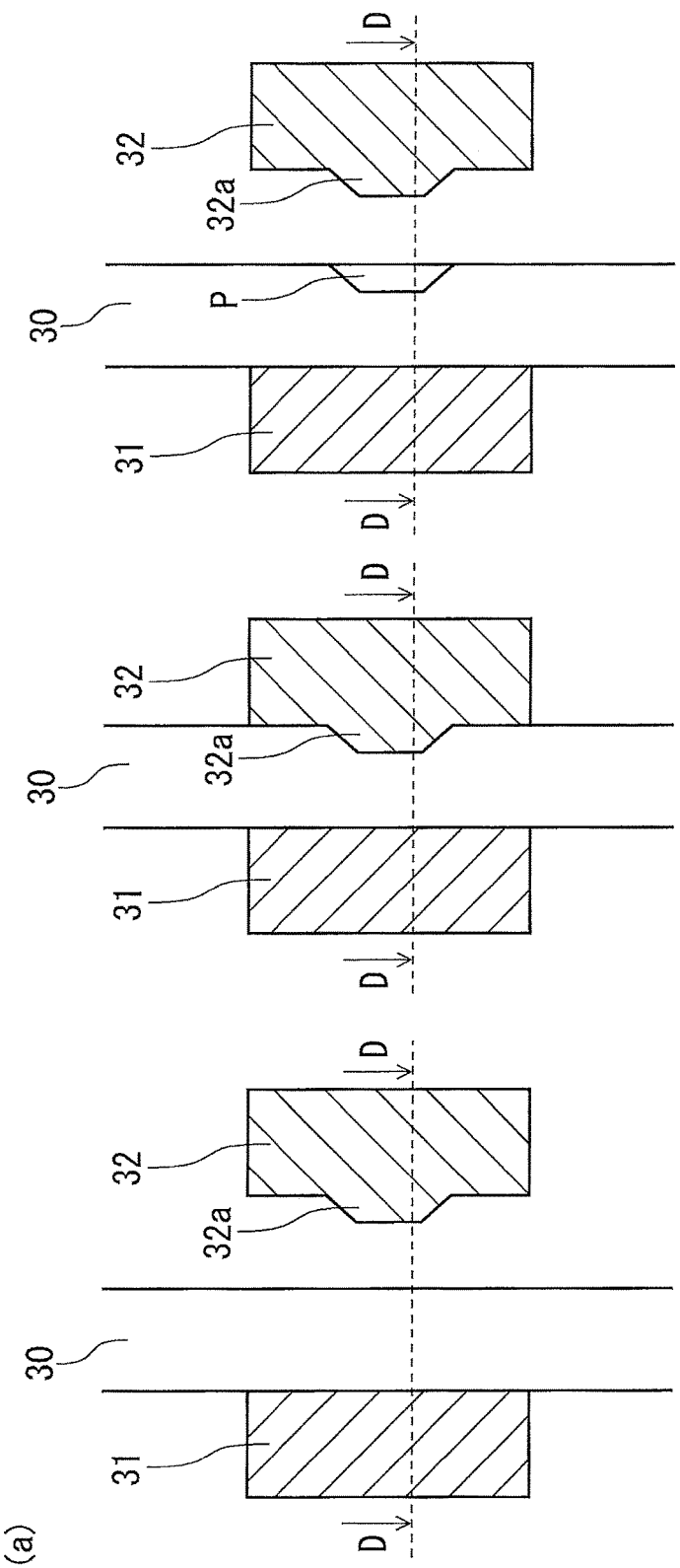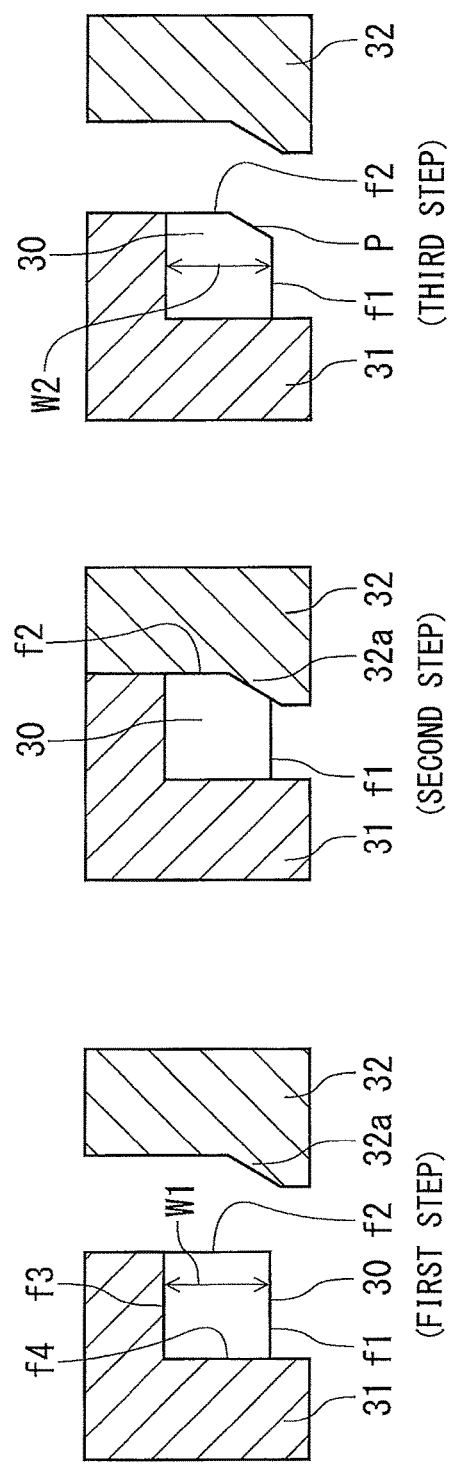
FIG. 15

FIG. 17
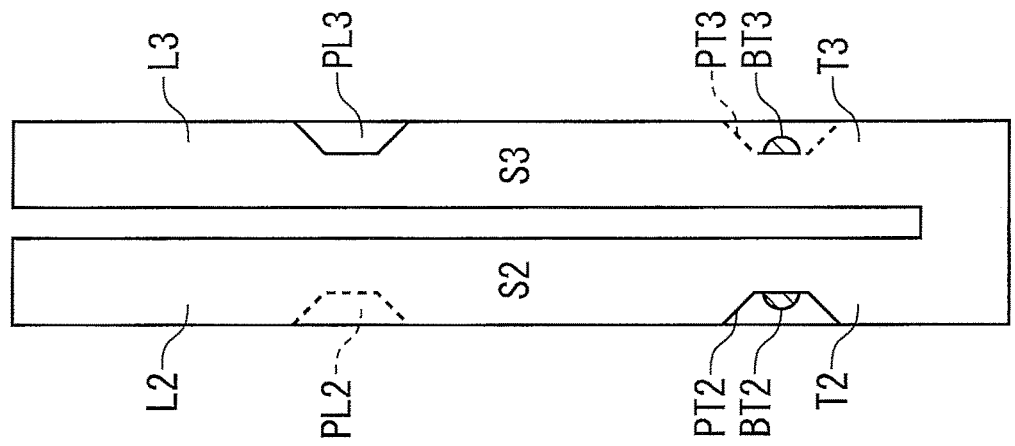
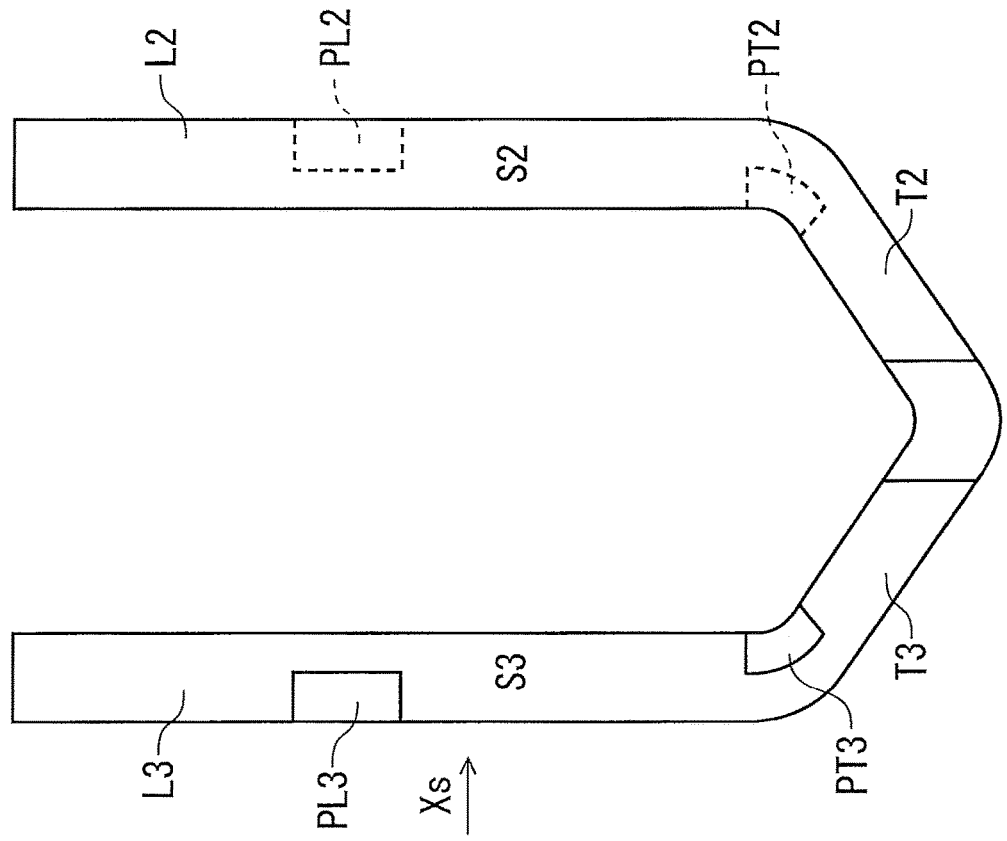

FIG. 18
(a) 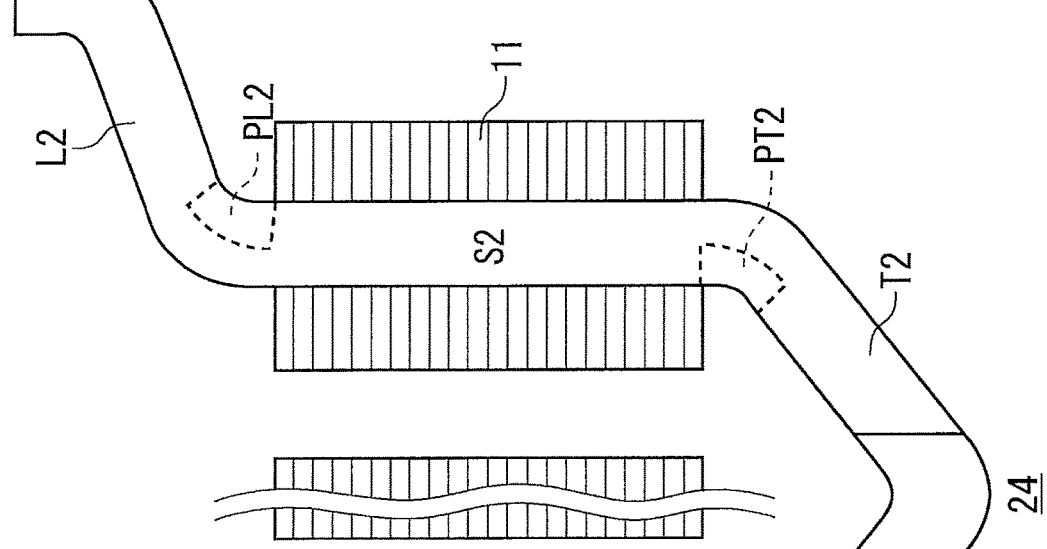
(b) 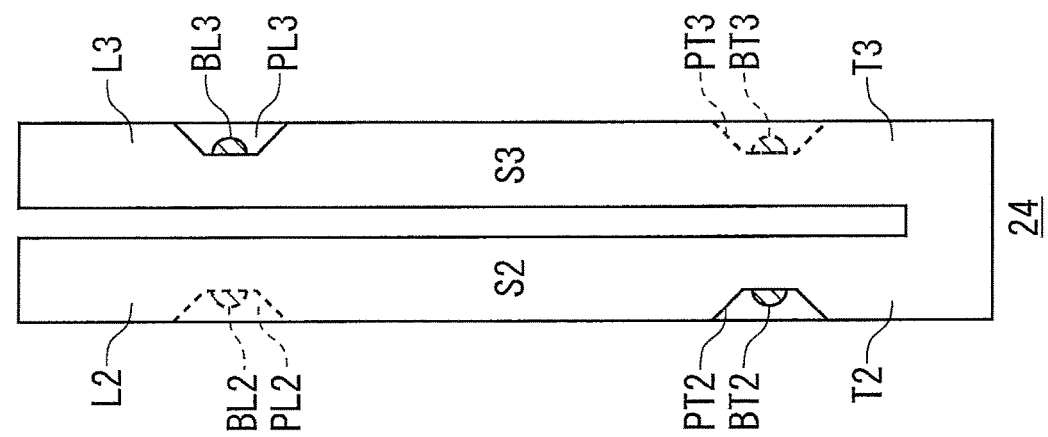

FIG. 19 (a)            (b)
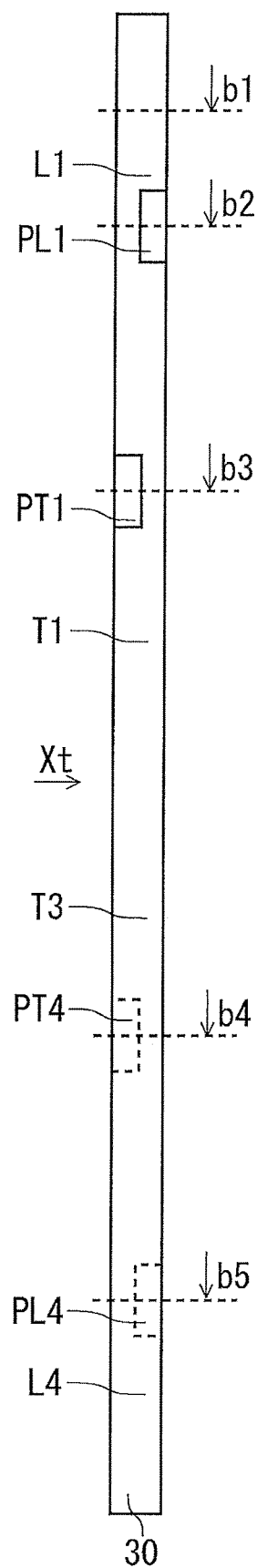

FIG. 29 (a)
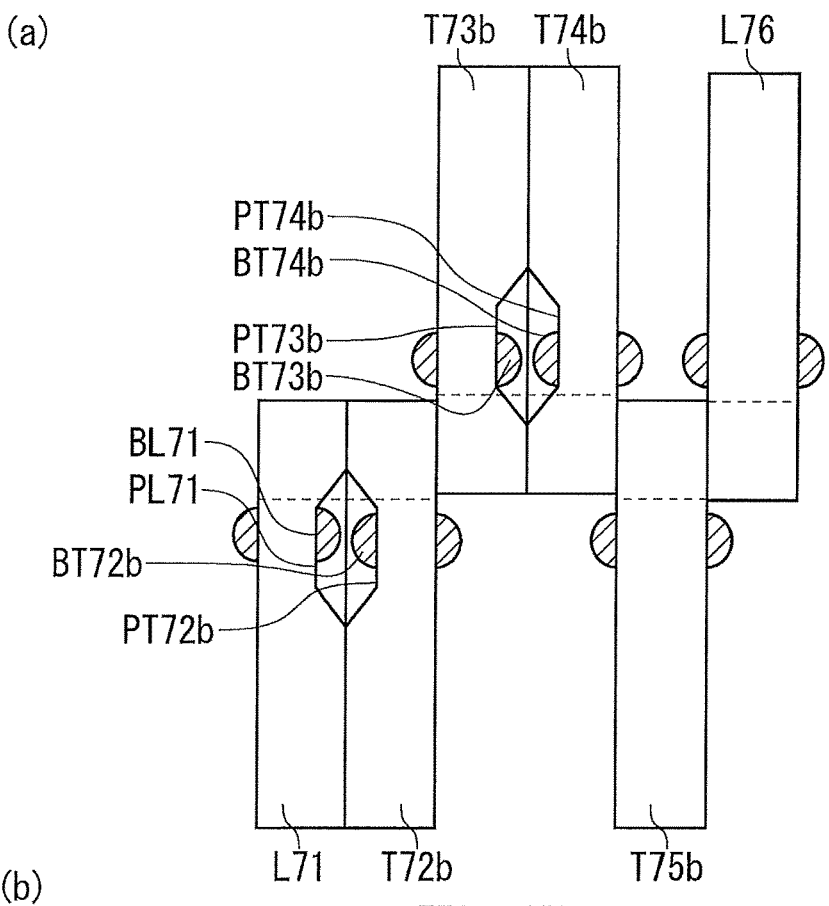
(b)
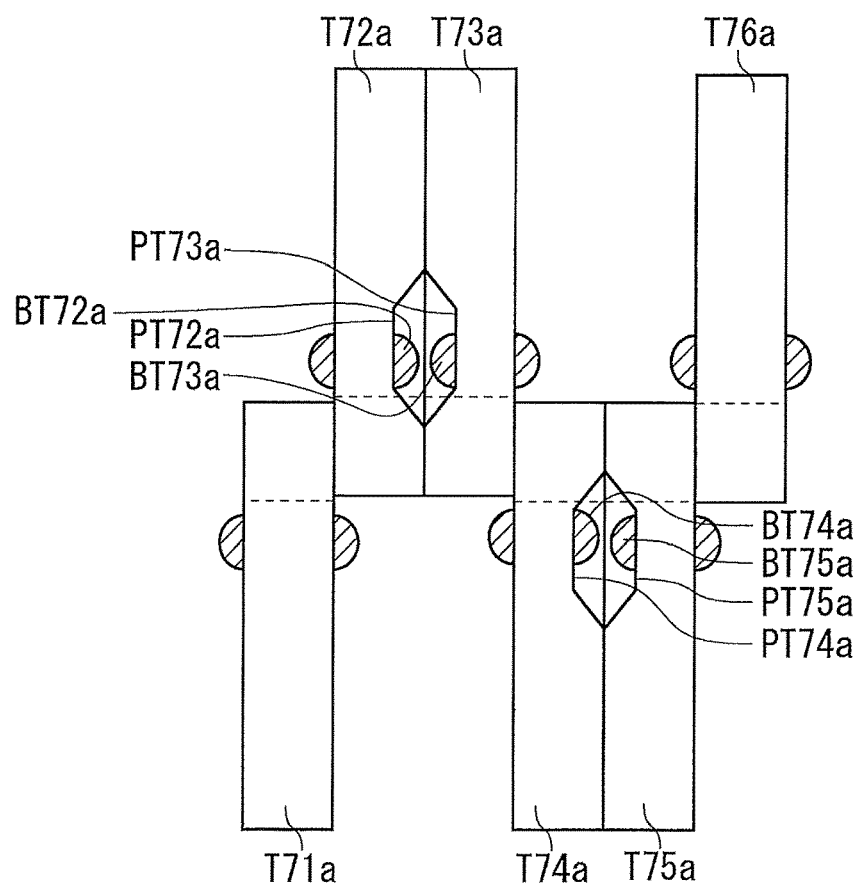

ROTATING ELECTRIC MACHINE AND ROTATING ELECTRIC MACHINE MANUFACTURING METHOD

TECHNICAL FIELD

The present invention relates to a rotating electric machine and a rotating electric machine manufacturing method, and in particular, relates to the structure of an armature composing a rotating electric machine, and a manufacturing method for the armature.

BACKGROUND ART

One of conventional armatures of rotating electric machines has coils including: a part inserted into each slot and formed in a plurality of layers stacked in the radial direction; a part where coil end portions protruding from slots adjacent to each other in the radial direction are bent toward the same side in the circumferential direction; and a part where such coil end portions are bent toward sides opposite to each other in the circumferential direction.

In this armature, the coils having coil end portions bent toward the same side in the circumferential direction have the same phase of the three-phase voltage and a potential difference therebetween is small. Therefore, it is not necessary to provide an insulation sheet for ensuring insulation between the coil end portions in the radial direction. However, the coils having coil end portions bent toward sides opposite to each other in the circumferential direction have different phases of the three-phase voltage and a potential difference therebetween is great. Therefore, an insulation sheet is provided between the coil end portions in the radial direction, to ensure insulation therebetween (see, for example, Patent Document 1).

CITATION LIST

Patent Document

Patent Document 1: Japanese Patent No. 4186872 (page 9, FIG. 2, FIGS. 8-9)

SUMMARY OF THE INVENTION

Problems to be Solved by the Invention

In recent years, in rotating electric machines, a small size and high output are required and the space factor of coils provided in an armature as a stator is required to be improved.

However, in the coils of the armature disclosed in Patent Document 1, when a coil end portion is bent in the circumferential direction, a bulging portion in the radial direction occurs on the bending inner side with respect to the neutral axis of the bent portion, and a thinned portion in the radial direction occurs on the bending outer side.

In the adjacent coils having coil end portions bent toward the same side in the circumferential direction, the bulging portions in the radial direction of these coils overlap each other, and therefore a gap in the radial direction between these coils needs to be wide.

That is, since a gap occurs between the coils adjacent to each other in the radial direction, the space factor of the coils decreases, thereby causing a problem that the efficiency and output of the rotating electric machine are decreased.

The present invention has been made to solve the above problem, and an object of the present invention is to obtain a rotating electric machine and a rotating electric machine manufacturing method which prevent occurrence of a gap between coils adjacent to each other in the radial direction, to improve the space factor of coils, thereby achieving high efficiency and high output.

Solution to the Problems

A rotating electric machine according to the present invention is a rotating electric machine including an armature and a rotor, the armature including an armature core and an armature winding formed by arranging a plurality of unit coils along a circumferential direction. Each unit coil includes: a plurality of slot accommodation portions located in different slots; a turn portion extending in a bent manner from each slot accommodation portion and connecting the slot accommodation portions to each other; and a leg portion extending in a bent manner from each slot accommodation portion. The plurality of slot accommodation portions are stacked in a radial direction in the slots, and recesses dented in the radial direction are formed in surfaces opposed to each other at bent parts of the turn portions or bent parts of the turn portion and the leg portion, that extend in a bent manner toward the same side in the circumferential direction from the slot accommodation portions adjacent to each other in the radial direction.

A rotating electric machine manufacturing method according to the present invention is a method for manufacturing a rotating electric machine including an armature and a rotor, the armature including an armature core and an armature winding formed by arranging a plurality of unit coils along a circumferential direction, the unit coil being formed by bending a conductive wire having an insulation coat. The method includes a step of forming a recess at a bending-planned part of the conductive wire.

In the step of forming the recess,
a first die having an L shape at both end surfaces thereof is arranged such that two inner side surfaces thereof are in contact with two surfaces adjacent to each other at a bending-planned part of the conductive wire, and a second die having a projection for forming the recess is arranged so as to be opposed to one surface, of the conductive wire, that is not in contact with the first die,
next, the second die is moved toward the first die so that the conductive wire is sandwiched and pressed between the first die and the second die, whereby the conductive wire is dented by the projection, and
next, the second die is moved in a direction away from the first die, and the conductive wire in which the recess has been formed is extracted.

Effect of the Invention

In the rotating electric machine according to the present invention, recesses dented in the radial direction are formed in surfaces opposed to each other at bent parts of the turn portions or bent parts of the turn portion and the leg portion, that extend in a bent manner toward the same side in the circumferential direction from the slot accommodation portions adjacent to each other in the radial direction. Therefore, the space factor of coils is improved and high efficiency and high output can be achieved.

The rotating electric machine manufacturing method according to the present invention includes a step of forming a recess at a bending-planned part of a conductive wire.

Therefore, it is possible to obtain a rotating electric machine having an improved space factor of coils and having high efficiency and high output.

BRIEF DESCRIPTION OF THE DRAWINGS

FIG. 4 is a schematic side view (a) of the armature of the rotating electric machine according to embodiment 1 of the present invention, and a schematic view (b) of an A-A cross section in the schematic side view.

FIG. 11 is a schematic view (a) of leg portions as seen from the direction of arrow Yo and a schematic view (b) of turn portions as seen from the direction of arrow Yu, in FIG. 10.

FIG. 13 is a schematic view (a) of leg portions as seen from the direction of arrow Yo and a schematic view (b) of turn portions as seen from the direction of arrow Yu, in FIG. 12.

FIG. 14 is an enlarged view (a) of a bent part F1 of an S1-side leg portion L1 and an enlarged view of a bent part F2 of an S2-side leg portion L2, in FIG. 11(a).

FIG. 15 is a schematic side view (a) showing the procedure for forming a recess at a bending-planned part of a conductive wire used for the armature according to embodiment 1 of the present invention, and a schematic view (b) of a D-D cross section in the schematic side view.

FIG. 17 is a schematic front view (a) showing a conductive wire for another partial coil in embodiment 1 of the present invention when the conductive wire is bent at a bending-planned part of a turn portion, and a schematic side view (b) as seen from the direction of arrow Xs in the schematic front view.

FIG. 18 is a schematic front view (a) of the manufactured other partial coil of the unit coil in embodiment 1 of the present invention, and a schematic side view (b) as seen from the direction of arrow Xs in the schematic front view.

FIG. 19 is a schematic front view (a) showing a conductive wire for forming one partial coil according to embodiment 1 of the present invention, when recesses are formed at the bending-planned parts thereof, and a schematic sectional view (b) of the conductive wire at each part.

FIG. 29 is a schematic view (a) on the wire-connection-side coil end side as seen from the direction of arrow Yo and a schematic view (b) on the non-wire-connection-side coil end side as seen from the direction of arrow Yu, in FIG. 28.

DESCRIPTION OF EMBODIMENTS

Hereinafter, a rotating electric machine according to the present invention will be described with reference to the drawings.

A circumferential direction, a radial direction, and an axial direction in the present invention refer to a circumferential direction, a radial direction, and an axial direction in an armature or a rotating electric machine unless otherwise specified.

Embodiment 1

Figure 1:
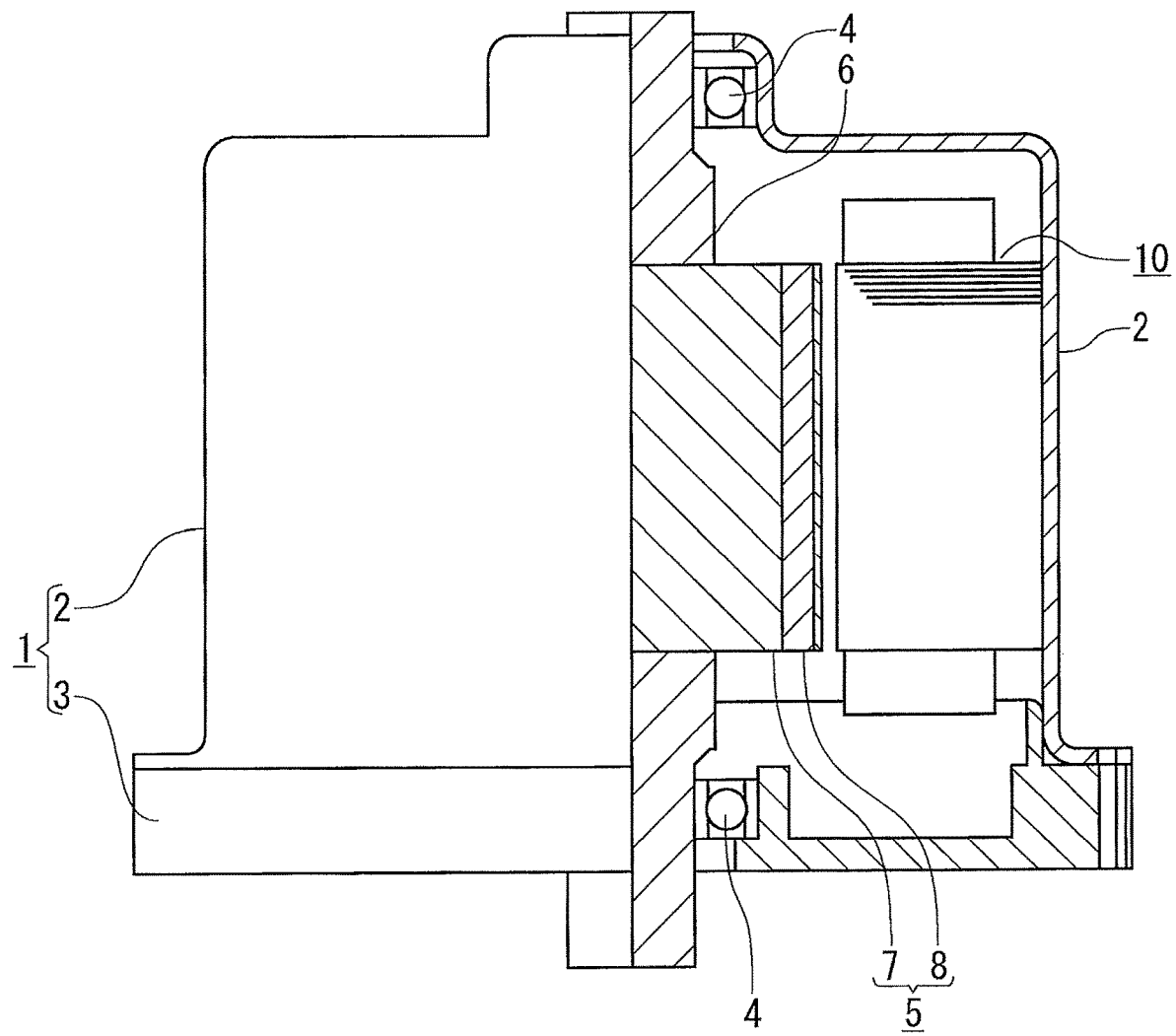
FIG. 1 is a schematic one-side sectional view of a rotating electric machine according to embodiment 1 of the present invention.

FIG. 1 is a schematic one-side sectional view of a rotating electric machine according to embodiment 1 of the present invention.

Figure 2:
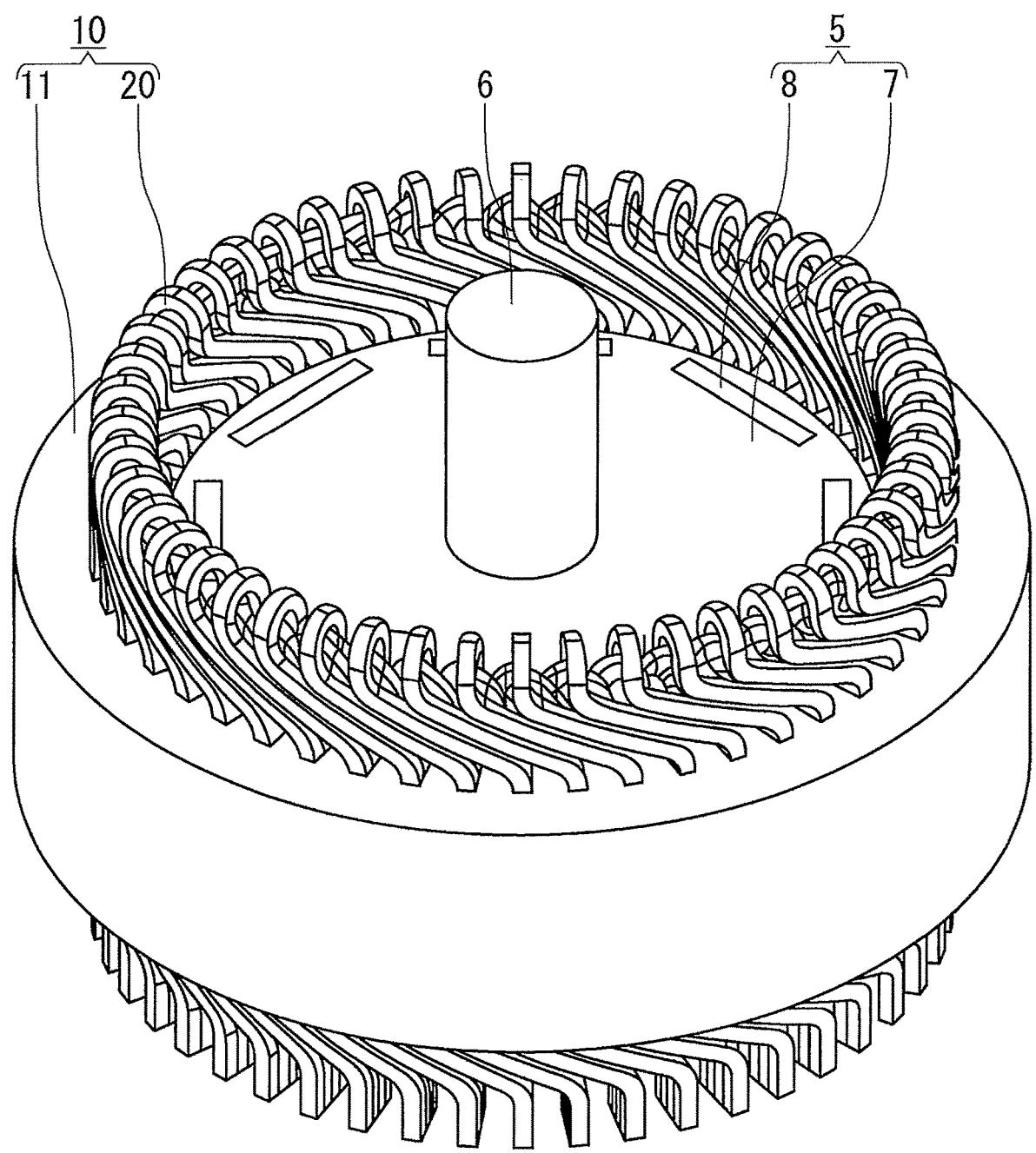
FIG. 2 is a schematic perspective view showing an armature and a rotor which are a major part of the rotating electric machine according to embodiment 1 of the present invention.

FIG. 2 is a schematic perspective view showing an armature and a rotor which are a major part of the rotating electric machine according to embodiment 1 of the present invention.

As shown in FIG. 1 and FIG. 2, the rotating electric machine 100 of the present embodiment includes: a housing 1 having a bottomed cylindrical frame 2 and an end plate 3 closing the opening of the frame 2; an armature 10 which is a stator and is fixed by being fitted into the cylinder part of the frame 2; and a rotor 5 provided on the inner circumferential side of the armature 10 with a gap provided therebetween.

The rotor 5 is a permanent magnet rotor including: a rotor core 7 fixed to a rotary shaft 6 inserted at the axis position; and permanent magnets 8 embedded on the outer circumferential side of the rotor core 7, arranged at a predetermined pitch in the circumferential direction, and forming magnetic poles. The rotary shaft 6 is rotatably supported via bearings 4 by the bottom part of the frame 2 and the end plate 3.

The rotor 5 in the present embodiment is a permanent magnet rotor. However, without limitation thereto, the rotor 5 may be a squirrel cage rotor in which non-insulated rotor conductors are accommodated in slots of a rotor core and are short-circuited at both sides by short-circuit rings, or may be a wound rotor in which insulated conductive wires are mounted to slots of a rotor core.

Figure 3:
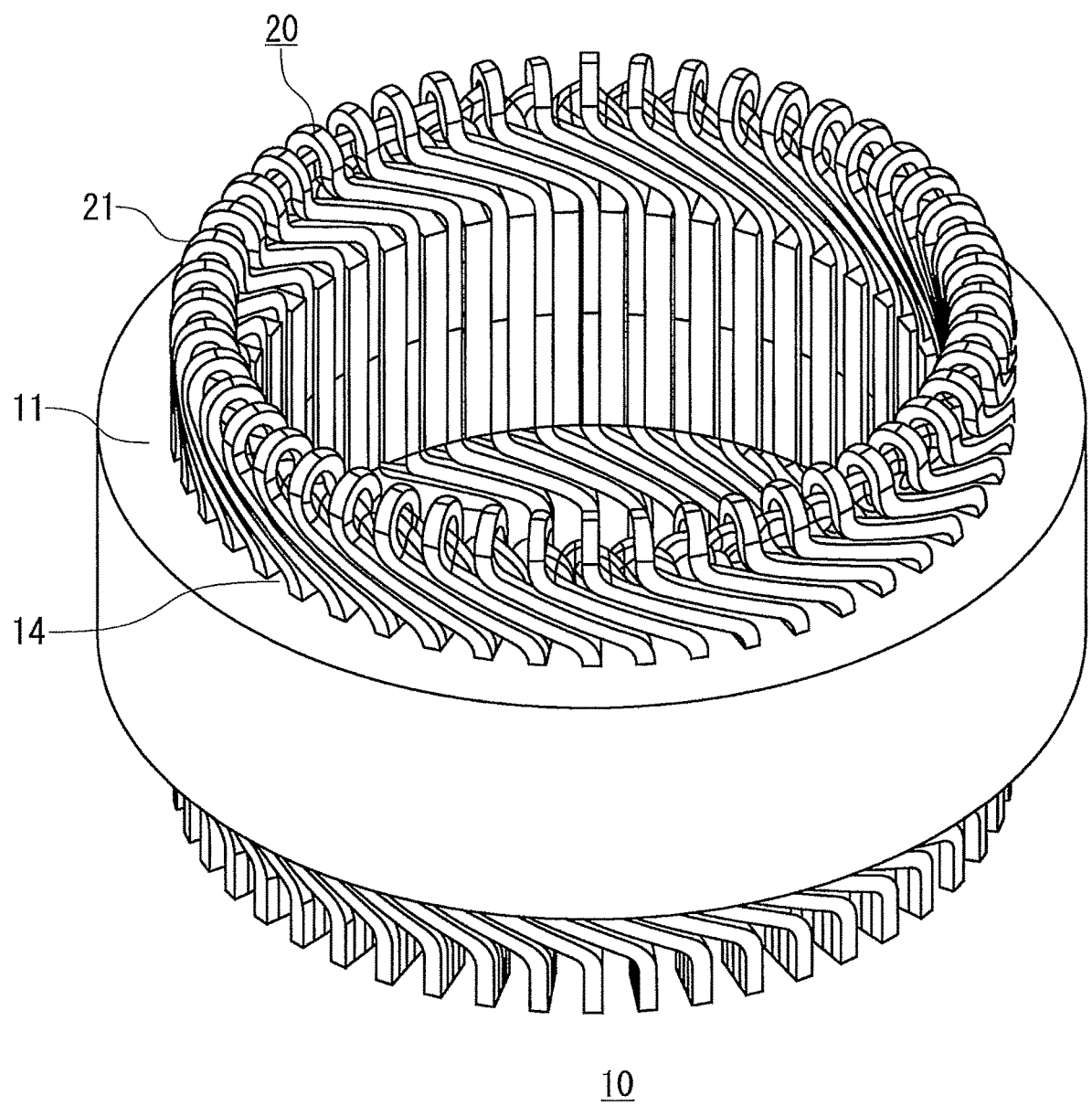
FIG. 3 is a schematic perspective view of the armature of the rotating electric machine according to embodiment 1 of the present invention.

FIG. 3 is a schematic perspective view of the armature of the rotating electric machine according to embodiment 1 of the present invention.

FIG. 4 is a schematic side view (a) of the armature of the rotating electric machine according to embodiment 1 of the present invention, and a schematic view (b) of an A-A cross section in the schematic side view.

As shown in FIG. 3 and FIG. 4, the armature 10 in the present embodiment includes: an armature core 11; a unit coil 21 composing an armature winding 20 mounted to the armature core 11; and a slot cell 14 physically separating the armature winding 20 and the armature core 11 from each other and electrically insulating them from each other.

As described later in detail, the armature winding 20 is formed by winding a conductive wire and generates a magnetic field when current is applied thereto. The magnetic flux of the generated magnetic field passes through the armature core 11.

In the present embodiment, for convenience of description, it is assumed that the number of poles is eight, the armature core 11 has forty-eight slots, and the armature winding 20 is a three-phase winding. That is, two slots are formed for each pole for each phase in the armature core 11.

Figure 5:
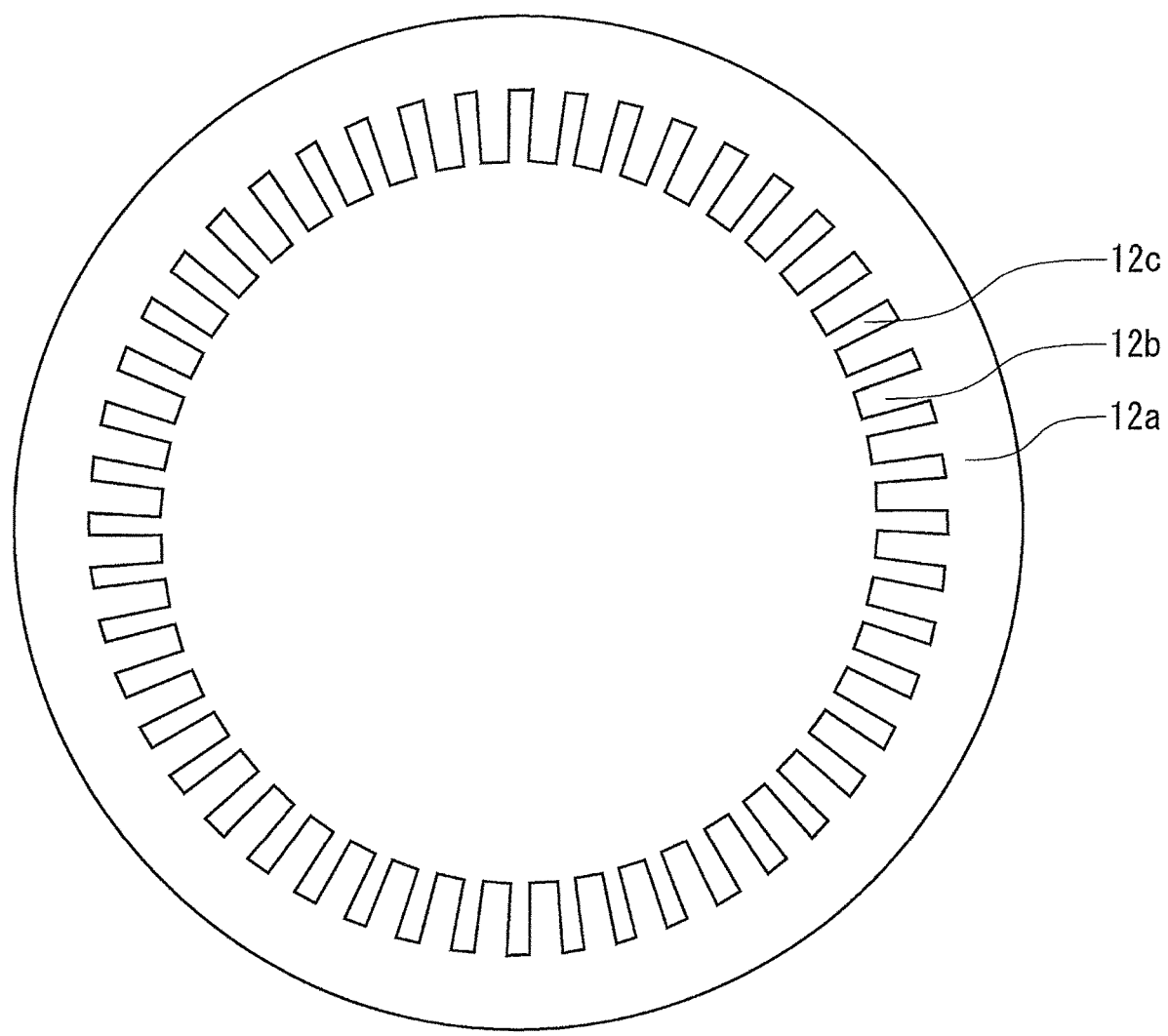
FIG. 5 is a schematic top view of an armature core of the rotating electric machine according to embodiment 1 of the present invention.

FIG. 5 is a schematic top view of the armature core in the rotating electric machine according to embodiment 1 of the present invention.

As shown in FIG. 5, the armature core 11 in the present embodiment is manufactured by stacking and integrating a predetermined number of armature core pieces made of electromagnetic steel sheets, and is composed of a cylindrical core back portion 12a and teeth 12b protruding inward in the radial direction from the inner circumferential wall surface of the core back portion 12a.

The gap between the adjacent teeth 12b is a slot 12c.

The slots 12c are opened inward and arranged at an equiangular pitch in the circumferential direction. Each tooth 12b has such a tapered shape that the width in the circumferential direction gradually decreases inward in the radial direction. Therefore, each slot 12c has a rectangular shape in a cross section as seen from the axial direction.

Figure 6:
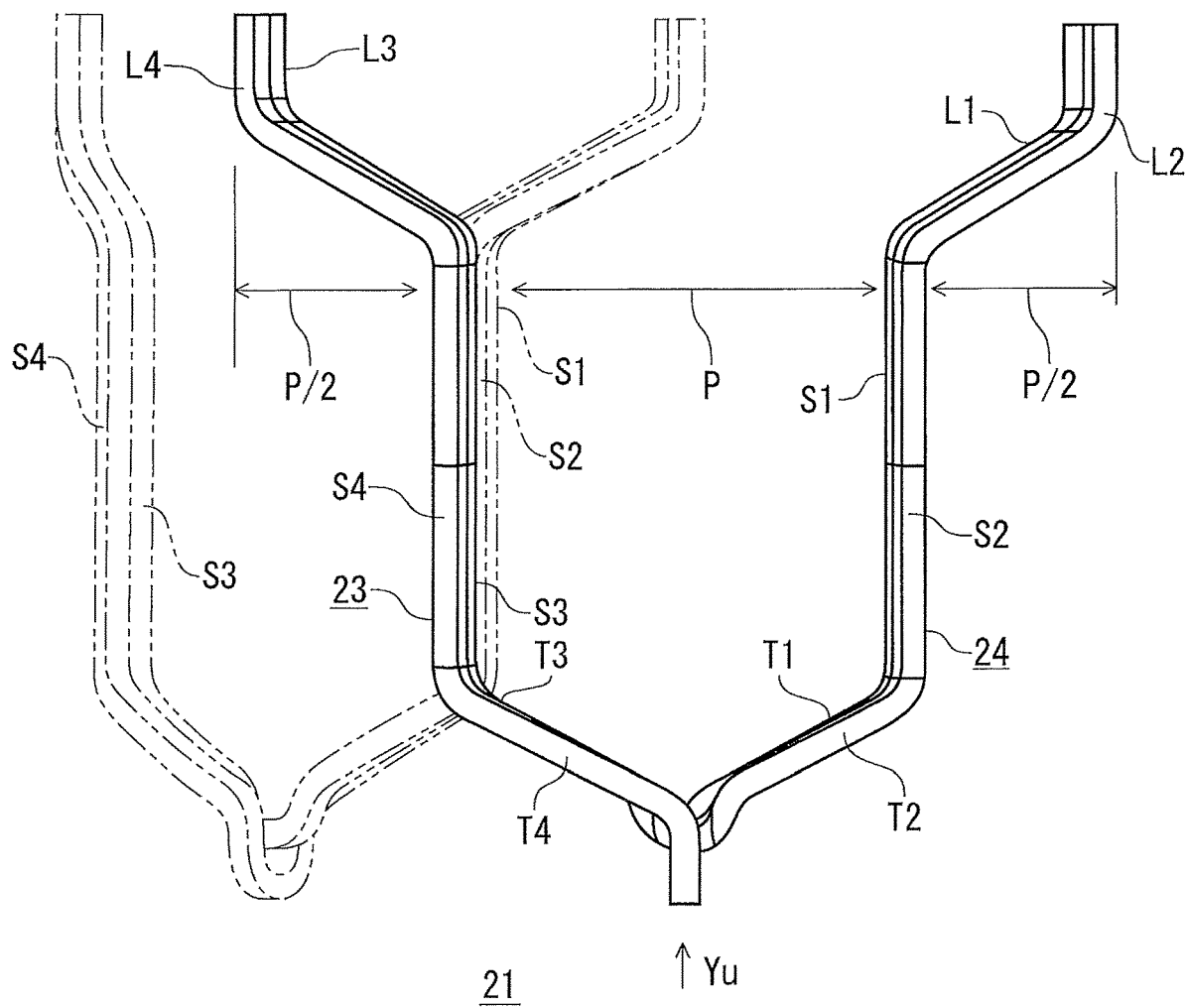
FIG. 6 is a schematic front view of a unit coil composing an armature winding of the rotating electric machine according to embodiment 1 of the present invention.

FIG. 6 is a schematic front view of a unit coil composing the armature winding of the rotating electric machine according to embodiment 1 of the present invention.

In FIG. 6, another unit coil 21 adjacent to one side in the circumferential direction of the unit coil 21 is indicated by a two-dot dashed line.

Figure 7:
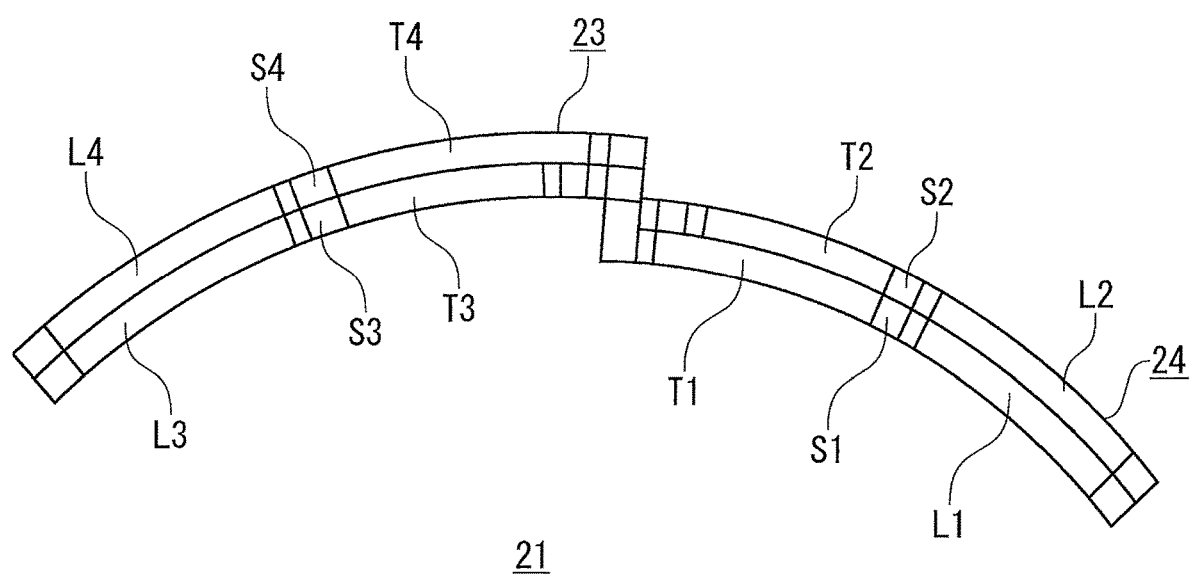
FIG. 7 is a schematic view of the unit coil in FIG. 6, as seen from the direction of arrow Yu.

FIG. 7 is a schematic view of the unit coil in FIG. 6 as seen from the direction of arrow Yu.

Figure 8:
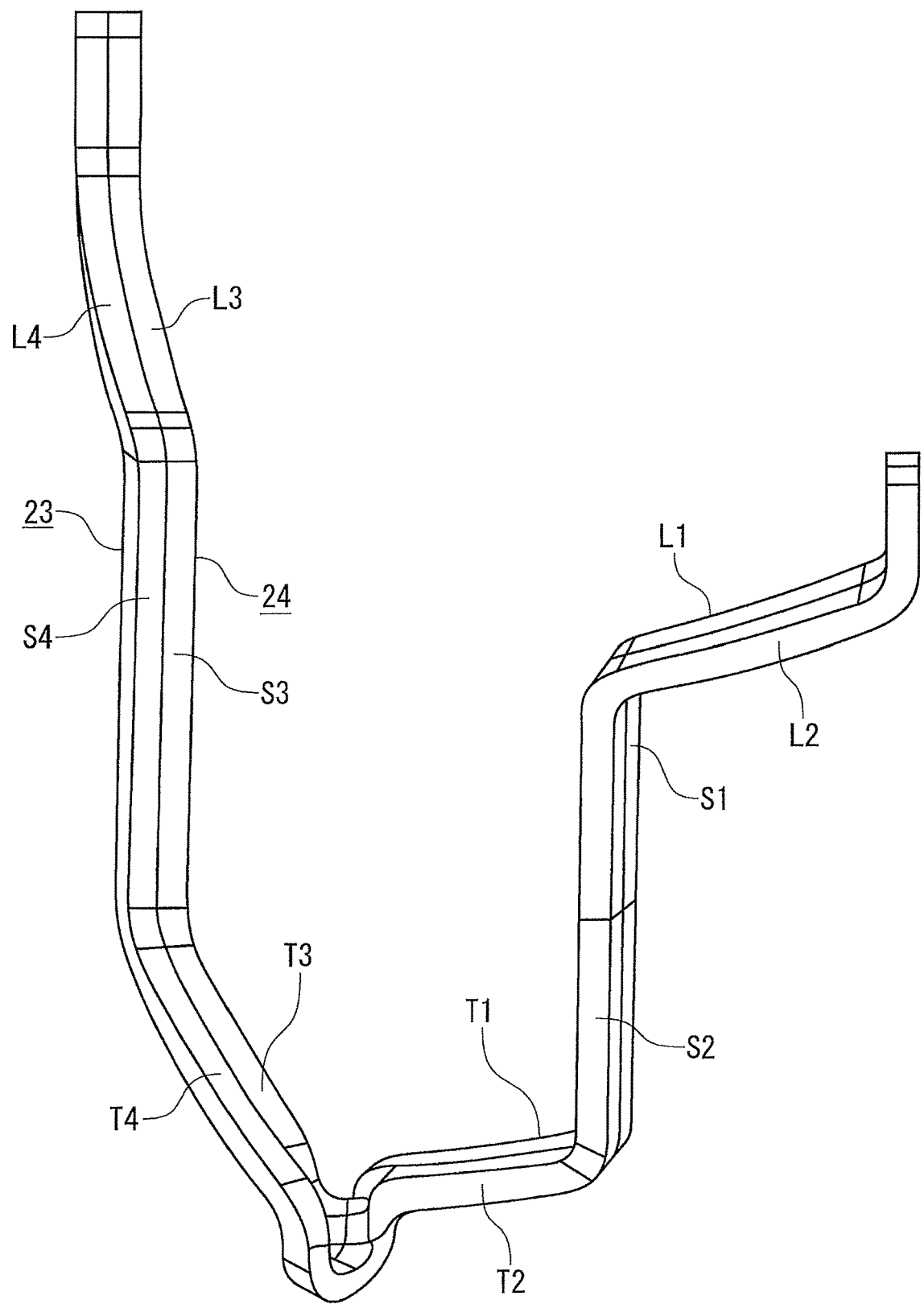
FIG. 8 is a schematic perspective view of the unit coil composing the armature winding of the rotating electric machine according to embodiment 1 of the present invention.

FIG. 8 is a schematic perspective view of the unit coil composing the armature winding of the rotating electric machine according to embodiment 1 of the present invention.

As shown in FIG. 6 to FIG. 8, the unit coil 21 in the present embodiment is formed of two partial coils 23, 24 as a pair, and one partial coil 23 and the other partial coil 24 overlap each other in the radial direction. The armature winding 20 is formed by continuously connecting, along the circumferential direction of the armature core, one round of the unit coils 21 each composed of a pair of one partial coil 23 and the other partial coil 24.

Each partial coil 23, 24 is formed of one conductive wire which has a rectangular sectional shape and which is continuous without connection portions and is made from a copper wire or an aluminum wire coated with an enamel resin so as to be insulated, for example.

One partial coil 23 has: two first and fourth slot accommodation portions S1, S4 having a straight-bar shape and to be accommodated in the slots 12c of the armature core 11; a continuous turn portion which, without connection portions, integrally connects the first slot accommodation portion S1 and the fourth slot accommodation portion S4; and two leg portions respectively protruding from the first and fourth slot accommodation portions S1, S4 and bent toward outer sides opposite to each other in the circumferential direction.

That is, in one partial coil 23, the turn portion is formed from a turn portion (referred to as an S1-side turn portion) T1 on the first slot accommodation portion S1 side and a turn portion (referred to as an S4-side turn portion) T4 on the fourth slot accommodation portion S4 side, and the leg portions include a leg portion (referred to as an S1-side leg portion) L1 on the first slot accommodation portion S1 side and a leg portion (referred to as an S4-side leg portion) L4 on the fourth slot accommodation portion S4 side.

The first slot accommodation portion S1 is shifted inward in the radial direction from the fourth slot accommodation portion S4 by three layers.

The other partial coil 24 has: two second and third slot accommodation portions S2, S3 having a straight-bar shape and to be accommodated in the slots 12c of the armature core 11; a continuous turn portion which, without connection portions, integrally connects the second slot accommodation portion S2 and the third slot accommodation portion S3; and two leg portions respectively protruding from the second and third slot accommodation portions S2, S3 and bent toward outer sides opposite to each other in the circumferential direction.

That is, in the other partial coil 24, the turn portion is formed from a turn portion (referred to as an S2-side turn portion) T2 on the second slot accommodation portion S2 side and a turn portion (referred to as an S3-side turn portion) T3 on the third slot accommodation portion S3 side, and the leg portions L include a leg portion (referred to as an S2-side leg portion) L2 on the second slot accommodation portion S2 side and a leg portion (referred to as an S3-side leg portion) L3 on the third slot accommodation portion S3 side.

The second slot accommodation portion S2 is shifted inward in the radial direction from the third slot accommodation portion S3 by one layer.

In the unit coil 21, the S1-side leg portion L1 and the S2-side leg portion L2 which are adjacent to each other in the radial direction are bent toward the same side in the circumferential direction, and the S4-side leg portion L4 and the S3-side leg portion L3 are also bent toward the same side in the circumferential direction.

The interval between the pair of slot accommodation portions S1, S4 of one partial coil 23, and the interval between the pair of slot accommodation portions S2, S3 of the other partial coil 24, are each designed to be a six-slot angular interval in the circumferential direction. The six-slot angular interval is the interval between the centers of the slots 12c separated from each other by six consecutive teeth 12b, and corresponds to one magnetic pole pitch P.

Terminal parts of the S1-side leg portion L1 and the S2-side leg portion L2 on one side of the unit coil 21 are separated from the slot accommodation portions S1, S2 by a distance corresponding to a half magnetic pole pitch (=P/2). Similarly, terminal parts of the S4-side leg portion L4 and the S3-side leg portion L3 on the other side of the unit coil 21 are separated from the slot accommodation portions S4, S3 by a distance corresponding to a half magnetic pole pitch (=P/2). The terminal parts of the leg portions L1, L2, L3, L4 on the respective sides are each joined by joining means to be connected to another partial coil, a power feed portion, a neutral point, or the like, thereby forming the armature winding.

In the present embodiment, the leg portion side is the wire-connection-side coil end of the unit coil 21, and the turn portion side is the non-wire-connection-side coil end of the unit coil 21.

Figure 9:
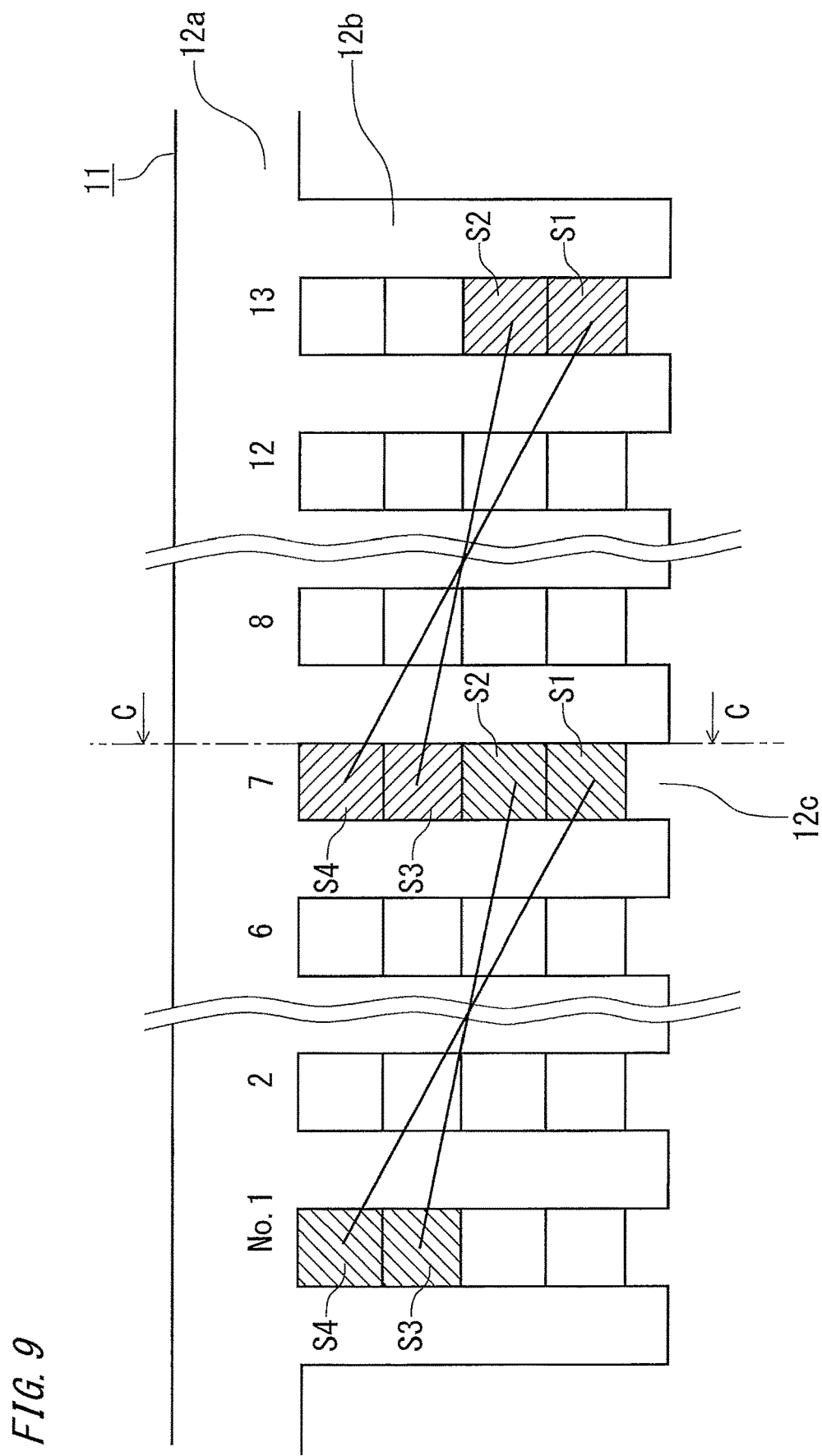
FIG. 9 is a schematic plan view on the non-wire-connection-side coil end side, showing a plurality of unit coils arranged in slots of the armature core, in the armature according to embodiment 1 of the present invention.

FIG. 9 is a schematic plan view on the non-wire-connection-side coil end side, showing a plurality of the unit coils arranged in the slots of the armature core in the armature according to embodiment 1 of the present invention.

In FIG. 9, for convenience of description, the teeth 12b and the slots 12c arranged in an annular shape in the armature core 11 are developed to be arranged in a straight line. In addition, for convenience of description, the slots 12c are serially numbered from left to right in the drawing.

FIG. 9 is a view of the unit coils 21 arranged in the armature core 11, as seen from the turn portion side as indicated by arrow Yu in FIG. 6, i.e., from the non-wire-connection-side coil end side.

In FIG. 9, the turn portions extending from the slot accommodation portions are on the front side of the drawing, and the leg portions extending from the slot accommodation portions are on the back side of the drawing.

As shown in FIG. 9, in the armature 10 in the present embodiment, for example, the unit coil 21 of which the fourth slot accommodation portion S4 of one partial coil 23 and the third slot accommodation portion S3 of the other partial coil 24 are located in the first slot 12c, is provided such that the first slot accommodation portion S1 of the one partial coil 23 and the second slot accommodation portion S2 of the other partial coil 24 are located in the seventh slot 12c separated from the first slot 12c by a six-slot angular interval.

In addition, the unit coil 21 of which the fourth slot accommodation portion S4 of one partial coil 23 and the third slot accommodation portion S3 of the other partial coil 24 are located in the seventh slot 12c, is provided such that the first slot accommodation portion S1 of the one partial coil 23 and the second slot accommodation portion S2 of the other partial coil 24 are located in the thirteenth slot 12c separated from the seventh slot 12c by a six-slot angular interval.

In FIG. 9, the third and fourth slot accommodation portions S3, S4 of the unit coil 21 indicated by a solid line in FIG. 6, and the first and second slot accommodation portions S1, S2 of the unit coil 21 indicated by a two-dot dashed line in FIG. 6, are located in the seventh slot 12c.

As shown in FIG. 9, in each slot 12c, the fourth slot accommodation portion S4 is located on the core back portion 12a side of the armature core 11, and the slot accommodation portion S1 is located on the opening side.

That is, in each slot 12c, the slot accommodation portions are arranged in the order of fourth slot accommodation portion S4, third slot accommodation portion S3, second slot accommodation portion S2, and then first slot accommodation portion S1, from the core back portion 12a side toward the inner side in the radial direction.

In each slot 12c, the first slot accommodation portion S1, the second slot accommodation portion S2, the third slot accommodation portion S3, and the fourth slot accommodation portion S4 are respectively located in the first layer, the second layer, the third layer, and the fourth layer from the slot opening side.

Figure 10:
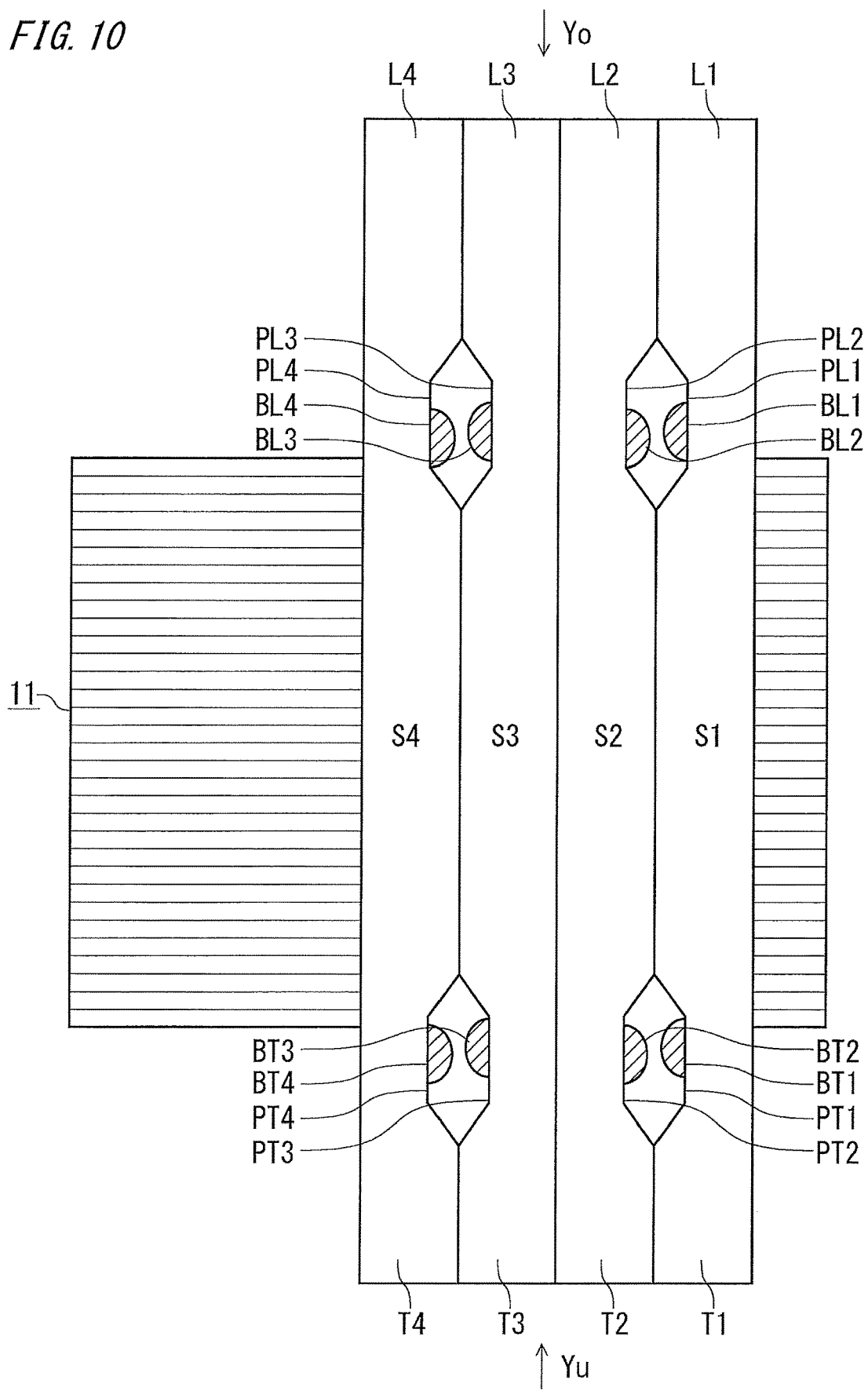
FIG. 10 is a schematic view of a C-C cross section of the armature in FIG. 9.

FIG. 10 is a schematic view of a C-C cross section of the armature in FIG. 9.

FIG. 11 is a schematic view (a) of leg portions as seen from the direction of arrow Yo and a schematic view (b) of turn portions as seen from the direction of arrow Yu, in FIG. 10.

FIG. 10 also shows the armature core 11 in which the unit coils 21 are arranged. The upper parts extending from the armature core 11 are the leg portions of the partial coils 23, 24, and the lower parts extending from the armature core 11 are the turn portions of the partial coils 23, 24.

FIG. 10 is a view when the unit coil in FIG. 6 is seen from the right in the drawing. Therefore, in FIG. 10, the S1-side leg portion L1 and the S2-side leg portion L2 are bent frontward in the drawing, and the S3-side leg portion L3 and the S4-side leg portion L4 are bent rearward in the drawing.

In addition, the S1-side turn portion T1 and the S2-side turn portion T2 are bent rearward in the drawing, and the S3-side turn portion T3 and the S4-side turn portion T4 are bent frontward in the drawing.

As shown in FIG. 10 and FIG. 11, the S1-side leg portion L1 and the S2-side leg portion L2 respectively have recesses PL1, PL2, in their surfaces opposed to each other's leg portions at the bent parts, and the S3-side leg portion L3 and the S4-side leg portion L4 respectively have the recesses PL3, PL4, in their surfaces opposed to each other's leg portions at the bent parts.

The recess PL1 and the recess PL2 are opposed to each other in the radial direction, and the recess PL3 and the recess PL4 are opposed to each other in the radial direction.

That is, the S4-side leg portion L4 and the S2-side leg portion L2 have the recesses in their surfaces facing inward in the radial direction, and the S3-side leg portion L3 and the S1-side leg portion L1 have the recesses in their surfaces facing outward in the radial direction.

As shown in FIG. 10 and FIG. 11, the S1-side turn portion T1 and the S2-side turn portion T2 respectively have recesses PT1, PT2, in their surfaces opposed to each other's turn portions at the bent parts, and the S3-side turn portion T3 and the S4-side turn portion T4 respectively have recesses PT3, PT4, in their surfaces opposed to each other's turn portions at the bent parts.

The recess PT1 and the recess PT2 are opposed to each other in the radial direction, and the recess PT3 and the recess PT4 are opposed to each other in the radial direction.

That is, the S4-side turn portion T4 and the S2-side turn portion T2 have the recesses in their surfaces facing inward in the radial direction, and the S3-side turn portion T3 and the S1-side turn portion T1 have the recesses in their surfaces facing outward in the radial direction.

Next, effects of the armature in the present embodiment will be described in comparison with an armature having a similar coil structure in a comparative example.

Figure 12:
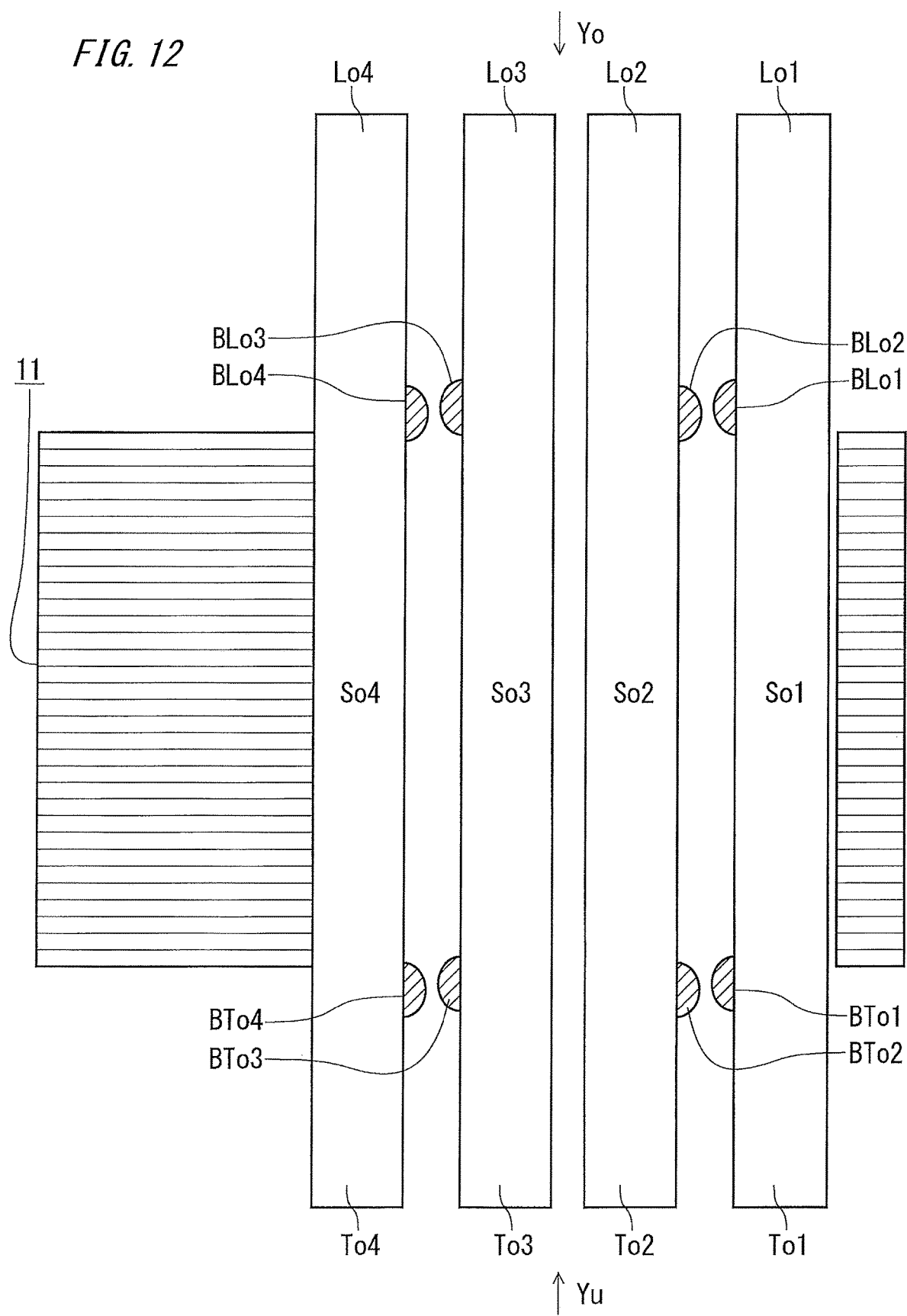
FIG. 12 is a schematic sectional view illustrating unit coils arranged in slots in an armature of a comparative example.

FIG. 12 is a schematic sectional view illustrating unit coils arranged in slots in the armature in the comparative example.

FIG. 13 is a schematic view (a) of leg portions as seen from the direction of arrow Yo and a schematic view (b) of turn portions as seen from the direction of arrow Yu, in FIG. 12.

FIG. 12 corresponds to the schematic view in FIG. 10 showing the armature in the present embodiment, and FIG. 13 corresponds to the schematic view in FIG. 11 showing the armature in the present embodiment.

FIG. 12 does not show bulging portions other than bulging portions BLo1, BTo1, BLo2, BTo2 on surfaces opposed to each other of a first slot accommodation portion So1 for a first layer and a second slot accommodation portion So2 for a second layer, and bulging portions BLo3, BTo3, BLo4, BTo4 on surfaces opposed to each other of a third slot accommodation portion So3 for a third layer and a fourth slot accommodation portion So4 for a fourth layer.

As shown in FIG. 12 and FIG. 13, the bulging portions BLo1, BTo1 caused by bending are formed on the radial-direction surfaces at the bent parts of a leg portion Lo1 and a turn portion To1 extending from the first slot accommodation portion So1 in the slot 12c.

In addition, bulging portions BLo2, BTo2 caused by bending are formed on the radial-direction surfaces at the bent parts of a leg portion Lo2 and a turn portion To2 extending from the second slot accommodation portion So2.

In addition, bulging portions BLo3, BTo3 caused by bending are formed on the radial-direction surfaces at the bent parts of a leg portion Lo3 and a turn portion To3 extending from the third slot accommodation portion So3.

In addition, bulging portions BLo4, BTo4 caused by bending are formed on the radial-direction surfaces at the bent parts of a leg portion Lo4 and a turn portion To4 extending from the fourth slot accommodation portion So4.

The leg portion Lo2 and the leg portion Lo3 extend toward sides opposite to each other in the circumferential direction and are not opposed to each other. Therefore, the bulging portion BLo2 and the bulging portion BLo3 are shifted from each other in the circumferential direction. The turn portion To2 and the turn portion To3 extend toward sides opposite to each other in the circumferential direction and are not opposed to each other. Therefore, the bulging portion BTo2 and the bulging portion BT3o are shifted from each other in the circumferential direction.

That is, almost no gap needs to be provided between the second slot accommodation portion So2 and the third slot accommodation portion So3, and if necessary, such a gap as to allow insertion of an insulation sheet may be provided.

However, the leg portion Lo1 and the leg portion Lo2 extend toward the same side in the circumferential direction and are opposed to each other. Therefore, the bulging portion BLo1 and the bulging portion BLo2 are opposed to each other. In addition, the turn portion To1 and the turn portion To2 extend toward the same side in the circumferential direction and are opposed to each other. Therefore, the bulging portion BTo1 and the bulging portion BTo2 are opposed to each other.

That is, since the bulging portion BLo1 and the bulging portion BLo2 are opposed to each other and the bulging portion BTo1 and the bulging portion BTo2 are opposed to each other, it is necessary to arrange, in the slot 12c, the first slot accommodation portion So1 and the second slot accommodation portion So2 with a gap provided therebetween in the radial direction.

The leg portion Lo3 and the leg portion Lo4 extend toward the same side in the circumferential direction and are opposed to each other. Therefore, the bulging portion BLo3 and the bulging portion BLo4 are opposed to each other. In addition, the turn portion To3 and the turn portion To4 extend toward the same side in the circumferential direction and are opposed to each other. Therefore, the bulging portion BTo3 and the bulging portion BTo4 are opposed to each other.

That is, since the bulging portion BLo3 and the bulging portion BLo4 are opposed to each other and the bulging portion BTo3 and the bulging portion BTo4 are opposed to each other, it is necessary to arrange, in the slot 12c, the third slot accommodation portion So3 and the fourth slot accommodation portion So4 with a gap provided therebetween for preventing their bulging portions from coming into contact with each other in the radial direction.

Thus, in the armature in the comparative example, the unit coil needs to have a gap between the slot accommodation portions thereof arranged in each slot, and therefore the space factor of the coils cannot be improved and it is difficult to achieve size reduction and output increase of the rotating electric machine.

FIG. 14 is an enlarged view (a) of a bent part F1 of the S1-side leg portion L1 and an enlarged view of a bent part F2 of the S2-side leg portion L2, in FIG. 11(a).

As shown in FIG. 14(a), the recess PL1 is formed in the surface (referred to as an L1 opposed surface), opposed to another leg portion (S2-side leg portion L2), at the bent part of the S1-side leg portion L1, and the bulging portion BL1 on the L1 opposed surface occurs in the recess PL1. Therefore, the bulging portion BL1 does not protrude outward of the L1 opposed surface.

As shown in FIG. 14(b), the recess PL2 is formed in the surface (referred to as an L2 opposed surface), opposed to another leg portion (S1-side leg portion L1), at the bent part of the S2-side leg portion L2, and the bulging portion BL2 on the L2 opposed surface occurs in the recess PL2. Therefore, the bulging portion BL2 does not protrude outward of the L2 opposed surface.

As shown in FIG. 10 and FIG. 11, the recess PT1 is formed in the surface (referred to as a T1 opposed surface), opposed to another turn portion (S2-side turn portion T2), at the bent part of the S1-side turn portion T1. Therefore, similarly, the bulging portion BT1 bulging toward the S2-side turn portion side does not protrude outward of the T1 opposed surface.

The recess PT2 is formed in the surface (referred to as a T2 opposed surface), opposed to another turn portion (S1-side turn portion T1), at the bent part of the S2-side turn portion T2. Therefore, similarly, the bulging portion BT2 bulging toward the S1-side turn portion side does not protrude outward of the T2 opposed surface.

As shown in FIG. 10 and FIG. 11, the recess PL3 is formed in the surface (referred to as an L3 opposed surface), opposed to another leg portion (S4-side leg portion L4), at the bent part of the S3-side leg portion L3. Therefore, similarly, the bulging portion BL3 bulging toward the S4-side leg portion side does not protrude outward of the L3 opposed surface.

The recess PL4 is formed in the surface (referred to as an L4 opposed surface), opposed to another leg portion (S3-side leg portion L3), at the bent part of the S4-side leg portion L4. Therefore, similarly, the bulging portion BL4 bulging toward the S3-side leg portion side does not protrude outward of the L4 opposed surface.

As shown in FIG. 10 and FIG. 11, the recess PT3 is formed in the surface (referred to as a T3 opposed surface), opposed to another turn portion (S4-side turn portion T4), at the bent part of the S3-side turn portion T3. Therefore, similarly, the bulging portion BT3 bulging toward the S4-side turn portion side does not protrude outward of the T3 opposed surface.

The recess PT4 is formed in the surface (referred to as a T4 opposed surface), opposed to another turn portion (S3-side turn portion T3), at the bent part of the S4-side turn portion T4. Therefore, similarly, the bulging portion BT4 bulging toward the S3-side turn portion side does not protrude outward of the T4 opposed surface.

As described later in detail, the recess formed in the surface, at each bent part of the leg portion and the turn portion, that is in contact with another leg portion or turn portion is provided at, for example, a corner portion between the bent-side surface and the surface opposed to the other leg portion or turn portion.

That is, in the unit coils 21 in the present embodiment, the bulging portions BL1, BT1, BL2, BT2 formed on the S1-side leg portion L1, the S1-side turn portion T1, the S2-side leg portion L2, and the S2-side turn portion T2 do not protrude outward of the L1 opposed surface, the T1 opposed surface, the L2 opposed surface, and the T2 opposed surface, respectively. Therefore, the L1 opposed surface and the L2 opposed surface are in contact with each other, and the T1 opposed surface and the T2 opposed surface are in contact with each other.

In addition, the bulging portions BL3, BT3, BL4, BT4 formed on the S3-side leg portion L3, the S3-side turn portion T3, the S4-side leg portion L4, and the S4-side turn portion T4 do not protrude outward of the L3 opposed surface, the T3 opposed surface, the L4 opposed surface, and the T4 opposed surface, respectively. Therefore, the L3 opposed surface and the L4 opposed surface are in contact with each other, and the T3 opposed surface and the T4 opposed surface are in contact with each other.

FIG. 10 does not show bulging portions other than the bulging portions BL1, BT1, BL2, BT2, BL3, BT3, BL4, BT4.

As shown in FIG. 11, a bulging portion BLr2 and a bulging portion BTr2 are also formed on surfaces, at the bent parts of the S2-side leg portion L2 and the S2-side turn portion T2, that are respectively opposed to the S3-side leg portion L3 and the S3-side turn portion T3, and a bulging portion BLr3 and a bulging portion BTr3 are formed on surfaces, at the bent parts of the S3-side leg portion L3 and the S3-side turn portion T3, that are respectively opposed to the S2-side leg portion L2 and the S2-side turn portion T2.

However, the side to which the S2-side leg portion L2 extends in the circumferential direction and the side to which the S3-side leg portion L3 extends in the circumferential direction are opposite to each other. Therefore, the bulging portion BLr2 and the bulging portion BLr3 do not overlap each other.

In addition, the side to which the S2-side turn portion T2 extends in the circumferential direction and the side to which the S3-side turn portion T3 extends in the circumferential direction are opposite to each other. Therefore, the bulging portion BTr2 and the bulging portion BTr3 do not overlap each other.

That is, the S2-side leg portion L2 and the S3-side leg portion L3 can be arranged with no gap provided therebetween in the radial direction, and the S2-side turn portion T2 and the S3-side turn portion T3 can be arranged with no gap provided therebetween in the radial direction.

In FIG. 10, no insulation members are provided between the S2-side leg portion L2 and the S3-side leg portion L3 and between the S2-side turn portion T2 and the S3-side turn portion T3. However, insulation members may be provided. For example, if insulation members such as insulation sheets are provided, an insulation distance can be ensured between coils for different phases, whereby insulation performance at the coil end part is further improved.

As shown in FIG. 11, bulging portions are also formed on surfaces, at the bent parts of the S1-side leg portion L1 and the S1-side turn portion T1, that face inward in the radial direction, and bulging portions are also formed on surfaces, at the bent parts of the S4-side leg portion L4 and the S4-side turn portion T4, that face outward in the radial direction. However, these bulging portions do not interfere with another leg portion or turn portion.

In the unit coils 21 of the armature in the present embodiment, the bulging portions do not protrude outward of the L1 opposed surface, the T1 opposed surface, the L2 opposed surface, and the T2 opposed surface, respectively, the L1 opposed surface and the L2 opposed surface are in contact with each other, and the T1 opposed surface and the T2 opposed surface are in contact with each other. In addition, the bulging portions do not protrude outward of the L3 opposed surface, the T3 opposed surface, the L4 opposed surface, and the T4 opposed surface, respectively, the L3 opposed surface and the L4 opposed surface are in contact with each other, and the T3 opposed surface and the T4 opposed surface are in contact with each other.

In addition, the leg portions, of one partial coil 23 and the other partial coil 24, that are in contact with each other extend toward the same side in the circumferential direction, and the turn portions thereof that are in contact with each other also extend toward the same side in the circumferential direction. Therefore, naturally, it is not necessary to provide insulation members between the leg portions that are in contact with each other and between the turn portions that are in contact with each other, of these partial coils.

That is, in the armature 10 of the present embodiment, in the unit coil 21, the leg portion and the turn portion extending from the first slot accommodation portion S1 are respectively in contact, in the radial direction, with the leg portion and the turn portion extending from the second slot accommodation portion S2.

In addition, the leg portion and the turn portion extending from the third slot accommodation portion S3 are respectively in contact, in the radial direction, with the leg portion and the turn portion extending from the fourth slot accommodation portion S4.

In addition, the leg portion and the turn portion extending from the second slot accommodation portion S2 are arranged with no gaps in the radial direction from the leg portion and the turn portion extending from the third slot accommodation portion S3.

Therefore, in the armature 10 in the present embodiment, the unit coils 21 can be arranged such that the first slot accommodation portion S1, the second slot accommodation portion S2, the third slot accommodation portion S3, and the fourth slot accommodation portion S4 are in contact with each other in the radial direction, in each slot 12c. Thus, the space factor of the coils can be improved and size reduction and output increase of the rotating electric machine can be achieved.

In addition, in the armature 10 in the present embodiment, it is not necessary to provide insulation members between the leg portions and between the turn portions. Therefore, productivity of the rotating electric machine is improved.

In addition, in the armature 10 in the present embodiment, at each bent part of the unit coil, one recess is provided correspondingly to the bulging portion on one side, of the bulging portions protruding on both sides in the radial direction. Therefore, damage on the insulation coat of the conductive wire forming the coil can be reduced and thus deterioration in insulation performance of the armature winding can be prevented.

Next, a method for manufacturing the unit coil 21 used for the armature 10 in the present embodiment will be described.

First, a conductive wire 30 having an insulation coat is prepared.

Next, a recess is formed at a bending-planned part of the conductive wire 30.

FIG. 15 is a schematic side view (a) showing the procedure for forming the recess at the bending-planned part of the conductive wire used for the armature according to embodiment 1 of the present invention, and a schematic view (b) of a D-D cross section of the schematic side view.

As shown in FIG. 15, in a first step, a first die 31 having an L shape at both end surfaces thereof is arranged such that two inner side surfaces thereof are in contact with, at the bending-planned part of the conductive wire 30, a surface (referred to as an opposite bent-side surface) f3 opposite to a bent-side surface f1, and a surface (referred to as an opposite protrusion-direction surface) f4 opposite to a surface (referred to as a protrusion-direction surface) f2 facing in a direction in which the bulging portion protrudes. In addition, a second die 32 having a projection 32a for forming the recess is arranged so as to be opposed to the protrusion-direction surface f2.

Next, in a second step, for example, the second die 32 is moved toward the first die 31 so that the conductive wire 30 is sandwiched and pressed between the first die 31 and the second die 32, whereby the corner portion between the bent-side surface f1 and the protrusion-direction surface f2 is dented by the projection 32a.

Next, in a third step, the second die 32 is moved to be separated from the first die 31, thus manufacturing the conductive wire 30 in which a recess P has been formed at the corner portion between the bent-side surface f1 and the protrusion-direction surface f2 at the bent part of the conductive wire 30.

As shown in FIG. 15(b), a distance W2 between the bent-side surface f1 and the opposite bent-side surface f3 at the bending-planned part after the recess is formed is greater than a distance W1 therebetween before the recess is formed.

Figure 16:
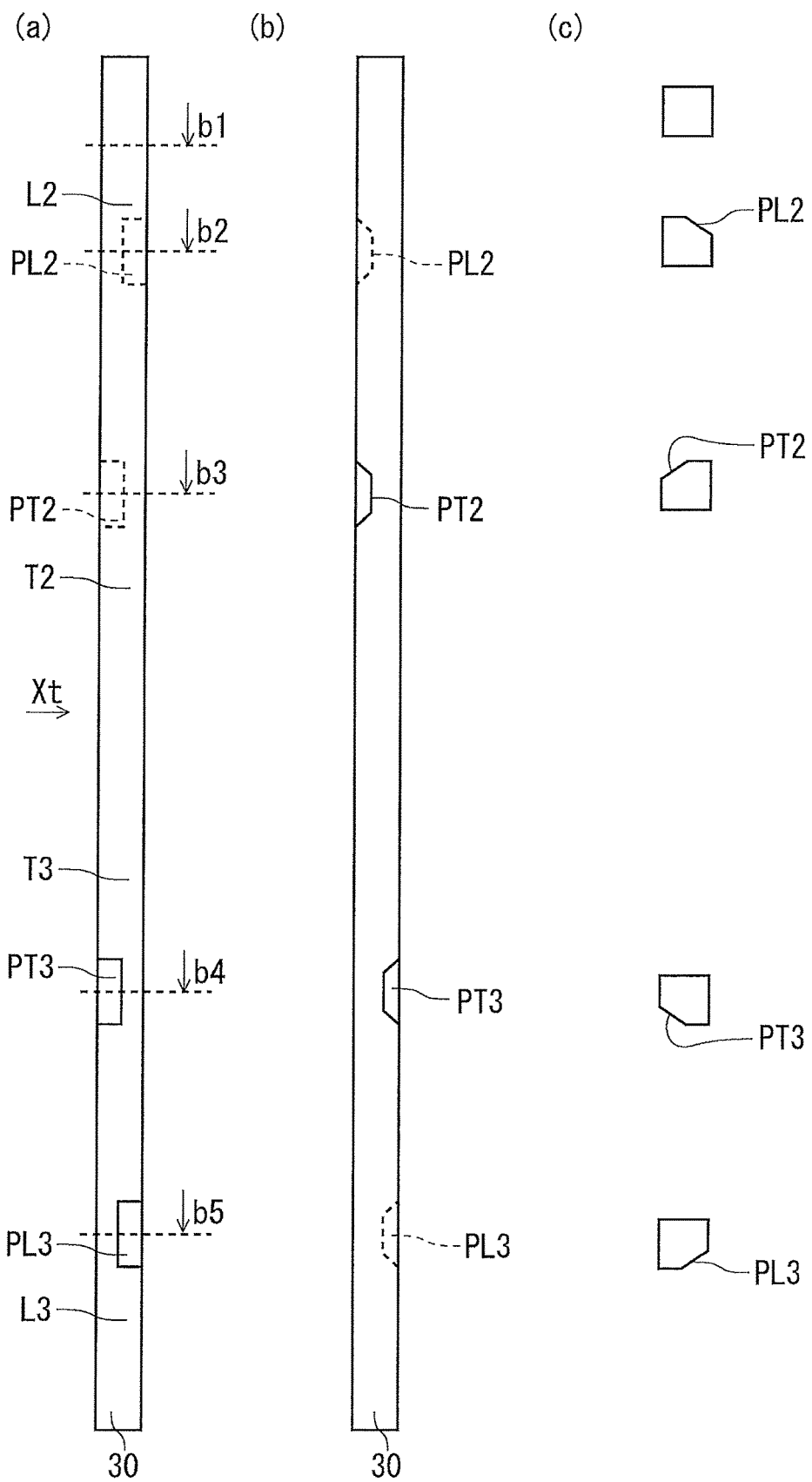
FIG. 16 is a schematic front view (a) and a schematic side view (b) showing the conductive wire used for the armature according to embodiment 1 of the present invention when recesses are formed at the respective bending-planned parts, and a schematic sectional view (c) of the conductive wire at each part.

FIG. 16 is a schematic front view (a) and a schematic side view (b) showing the conductive wire used for the armature according to embodiment 1 of the present invention when the recesses are formed at the respective bending-planned parts, and a schematic sectional view (c) of the conductive wire at each part.

FIG. 16 shows a conductive wire for forming the other partial coil 24. FIG. 16(b) is a schematic side view of the conductive wire in FIG. 16(a) as seen from the direction of arrow Xt, and FIG. 16(c) is a schematic sectional view at each position b1, b2, b3, b4, b5 in FIG. 16(b).

As shown in FIG. 16, the recess PL2, the recess PT2, the recess PT3, and the recess PL3 are formed at the respective bending-planned parts of the S2-side leg portion L2, the S2-side turn portion T2, the S3-side turn portion T3, and the S3-side leg portion L3, from the upper side of the conductive wire 30.

Next, the conductive wire 30 is bent at the bending-planned part of the turn portion at which the recess PT2 or the recess PT3 is formed. The bending direction is toward the side on which the recess at the left in the drawing of FIG. 16(a) is formed.

FIG. 17 is a schematic front view (a) showing the conductive wire for forming the other partial coil in embodiment 1 of the present invention, when the conductive wire is bent at the bending-planned parts of the turn portions, and a schematic side view (b) as seen from the direction of arrow Xs in the schematic front view.

As shown in FIG. 17(b), the bulging portion BT2 is formed in the recess PT2, and the bulging portion BT3 is formed in the recess PT3. However, the bulging portions BT2, BT3 do not protrude outward of the protrusion-direction surface f2 of the conductive wire.

Next, the conductive wire is bent at the bending-planned part of the leg portion at which the recess PL2 or the recess PL3 is formed, thus manufacturing the other partial coil 24.

The bending direction of the bending-planned part of the recess PL2 is toward the side on which the recess at the right in the drawing of FIG. 17(a) is formed, and the bending direction of the bending-planned part of the recess PL3 is toward the side on which the recess at left in the drawing of FIG. 17(a) is formed.

FIG. 18 is a schematic front view (a) of the manufactured other partial coil of the unit coil in embodiment 1 of the present invention, and a schematic side view (b) as seen from the direction of arrow Xs in the schematic front view.

FIG. 18(a) also shows the armature core 11.

As shown in FIG. 18(b), the bulging portion BL3 is formed in the recess PL3, and the bulging portion BL2 is formed in the recess PL2. However, the bulging portions BL3, BL2 also do not protrude outward of the protrusion-direction surface f2 of the conductive wire.

FIG. 19 is a schematic front view (a) showing the conductive wire for forming one partial coil according to embodiment 1 of the present invention, when the recesses are formed at the bending-planned parts thereof, and a schematic sectional view (b) of the conductive wire at each part.

Comparing FIG. 19(a) with FIG. 16(a), in one partial coil 23, the corner portions where the recesses are formed at the bending-planned parts of the conductive wire are reversed from those of the conductive wire of the other partial coil 24, in the front-back direction of the drawing.

That is, one partial coil 23 is manufactured in the same manner as the other partial coil 24 except for difference in the corner portions where the recesses are formed in the conductive wire.

In the manufacturing method for the unit coil in the present embodiment, the unit coil can be manufactured such that the bulging portions formed on the leg portion and the turn portion are not in contact with the bulging portions of the leg portion and the turn portion of another layer adjacent in the radial direction. Therefore, it is possible to manufacture a rotating electric machine having an improved space factor of coils and having a small size and high output.

In addition, the recess for preventing the bulging portion from protruding outward of the surface, of the unit coil, that is in contact with another adjacent layer is provided at the corner portion of the conductive wire forming the unit coil. Therefore, it is possible to reduce damage on the insulation coat and prevent deterioration in insulation reliability of the armature winding.

When the recess is formed at the corner portion of the conductive wire, the distance W2 between the bent-side surface f1 and the opposite bent-side surface f3 at the bending-planned part after the recess is formed becomes greater than the distance W1 therebetween before the recess is formed. Therefore, reduction in the sectional area of the conductive wire along a direction perpendicular to the direction in which current flows can be suppressed, and thus copper loss can be reduced.

This distance between the bent-side surface f1 and the opposite bent-side surface f3 is the width of the unit coil in the circumferential direction. However, since the bent part is outside the slot, there is no influence on mounting of the unit coil to the slot.

Embodiment 2

Figure 20:
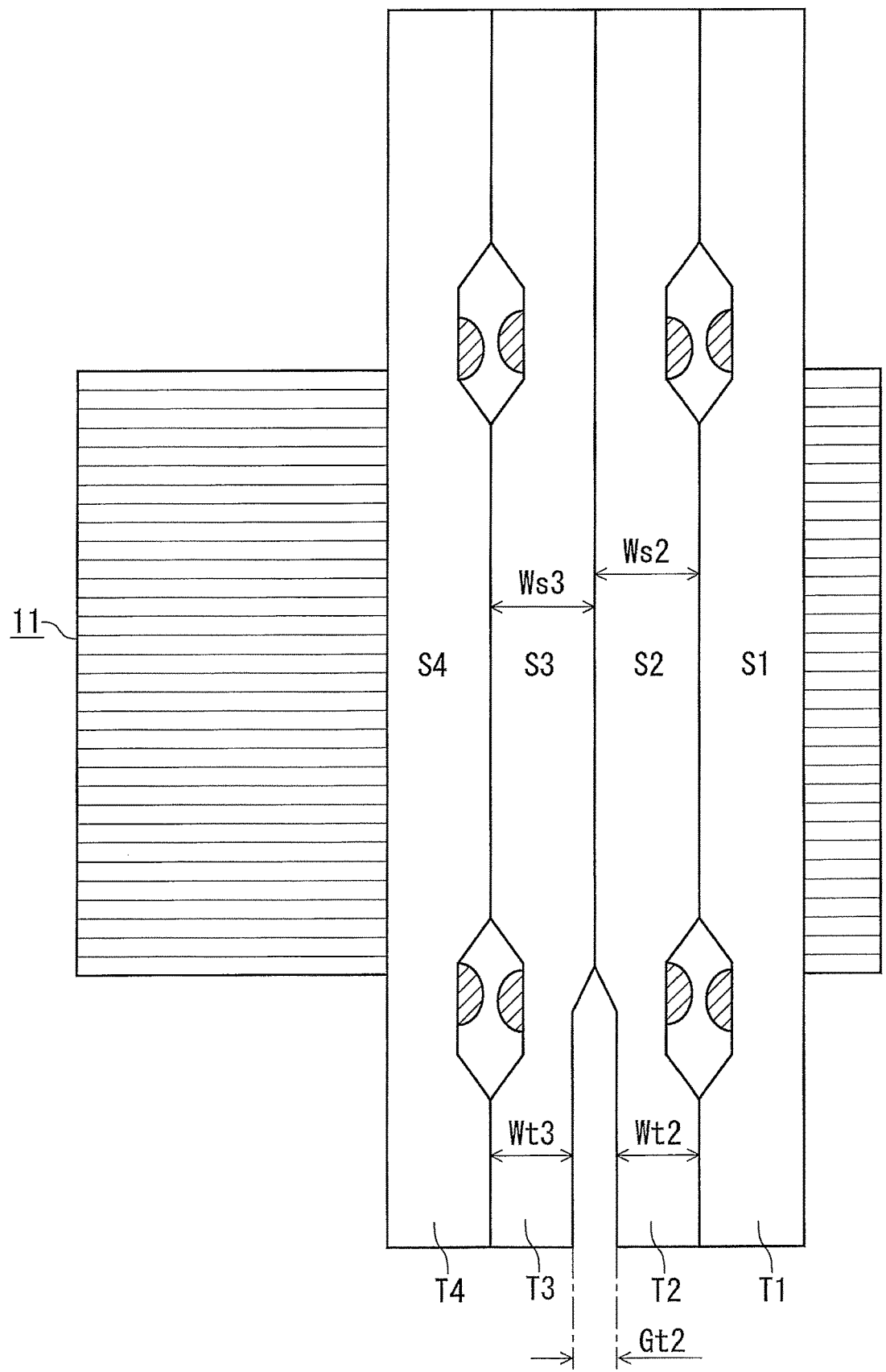
FIG. 20 is a schematic sectional view in the circumferential direction of unit coils mounted to a slot in a rotating electric machine according to embodiment 2 of the present invention.

FIG. 20 is a schematic sectional view in the circumferential direction, of unit coils mounted to a slot in a rotating electric machine according to embodiment 2 of the present invention.

FIG. 20 corresponds to FIG. 10 showing the armature in embodiment 1.

In FIG. 20, the unit coil for the first slot accommodation portion S1 and the second slot accommodation portion S2, and the unit coil for the third slot accommodation portion S3 and the fourth slot accommodation portion S4, are separate unit coils.

In the rotating electric machine in the present embodiment, the structure of unit coils, in particular, the structure of the S2-side turn portion T2 and the S3-side turn portion T3 at the non-wire-connection-side coil end, is different, but the sides to which the turn portions and the leg portions extend in the circumferential direction, and the positions of the recesses, are the same as in the unit coils in embodiment 1, and the same effect as that of the rotating electric machine in embodiment 1 is provided.

As shown in FIG. 20, in the unit coil in the present embodiment, a width Wt2 in the radial direction of the S2-side turn portion T2 extending from the second slot accommodation portion S2 is smaller than a width Ws2 in the radial direction of the second slot accommodation portion S2. In addition, a width Wt3 in the radial direction of the S3-side turn portion T3 extending from the third slot accommodation portion S3 is smaller than a width Ws3 in the radial direction of the third slot accommodation portion S3.

That is, a gap Gt2 in the radial direction is provided between the S2-side turn portion T2 and the S3-side turn portion T3 which extend toward different sides in the circumferential direction.

In the rotating electric machine in the present embodiment, the unit coils are configured such that the gap Gt2 in the radial direction is provided between the S2-side turn portion T2 and the S3-side turn portion T3 which extend toward different sides in the circumferential direction. Therefore, it is possible to provide an insulation member between the S2-side turn portion T2 and the S3-side turn portion T3 which have different phases, without providing a gap between the second slot accommodation portion S2 and the third slot accommodation portion S3. Thus, insulation performance of the turn portions is improved and insulation reliability of the coil end part on the non-wire-connection side is improved.

Embodiment 3

Figure 21:
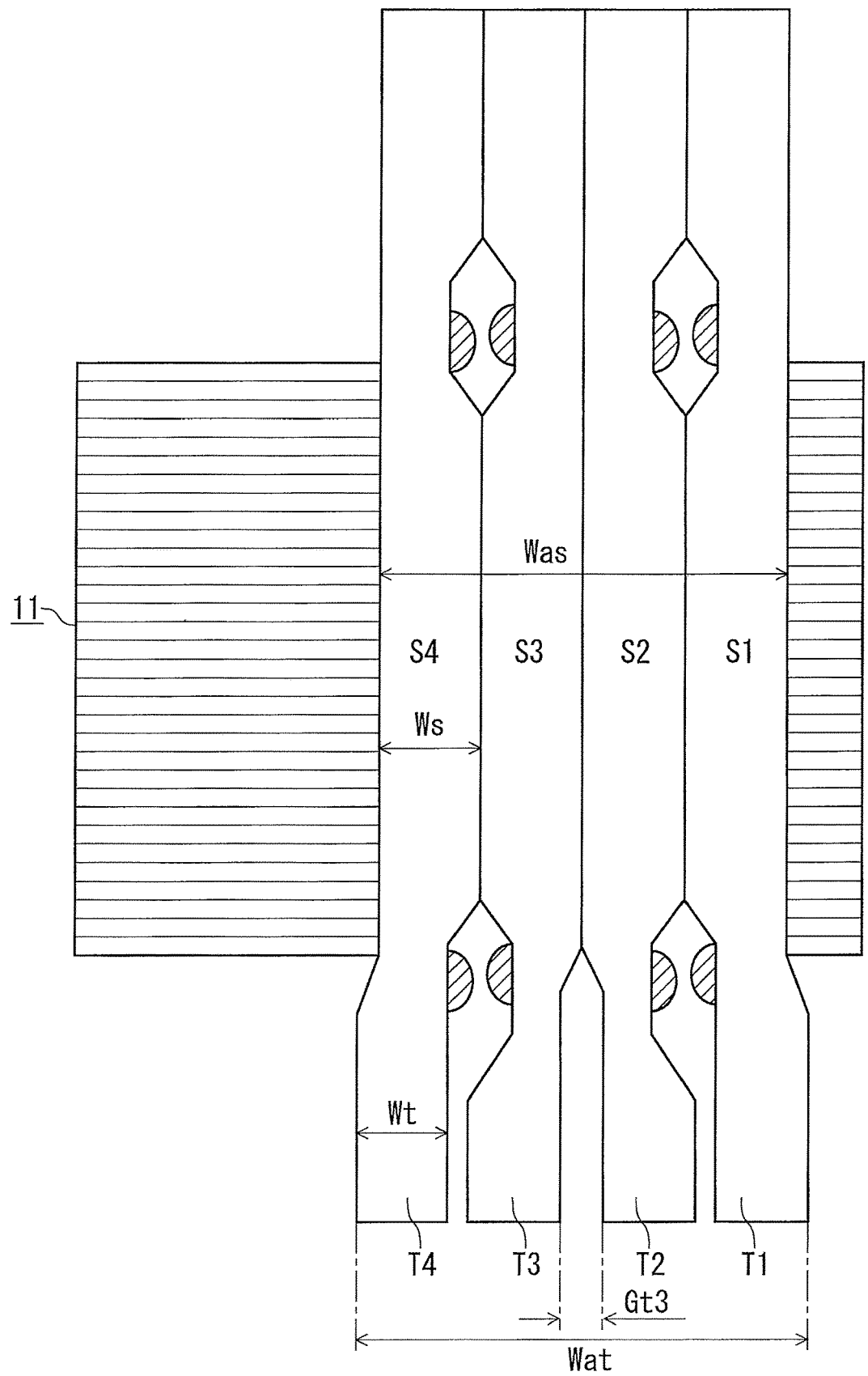
FIG. 21 is a schematic sectional view in the circumferential direction of unit coils mounted to a slot in a rotating electric machine according to embodiment 3 of the present invention.

FIG. 21 is a schematic sectional view in the circumferential direction, of unit coils mounted to a slot in a rotating electric machine according to embodiment 3 of the present invention.

FIG. 21 corresponds to FIG. 10 showing the armature in embodiment 1.

In FIG. 21, the unit coil for the first slot accommodation portion S1 and the second slot accommodation portion S2, and the unit coil for the third slot accommodation portion S3 and the fourth slot accommodation portion S4, are separate unit coils.

In the rotating electric machine in the present embodiment, the structure of unit coils, in particular, the structure of the non-wire-connection-side coil end, is different, but the sides to which the turn portions and the leg portions extend in the circumferential direction, and the positions of the recesses, are the same as in the unit coils in embodiment 1, and the same effect as that of the rotating electric machine in embodiment 1 is provided.

As shown in FIG. 21, in the unit coils in the present embodiment, the S1-side turn portion T1 extending from the first accommodation portion S1 and the S2-side turn portion T2 extending from the second accommodation portion S2 are positioned inward in the radial direction with respect to the respective slot accommodation portions S1, S2.

In addition, the S4-side turn portion T4 extending from the fourth slot accommodation portion S4 and the S3-side turn portion T3 extending from the third accommodation portion S3 are positioned outward in the radial direction with respect to the respective slot accommodation portions S3, S4.

That is, an interval Wat between the radially inner side surface of the S1-side turn portion T1 and the radially outer side surface of the S4-side turn portion T4 is greater than a width Was in the radial direction of all the slot accommodation portions.

That is, a gap Gt3 in the radial direction is provided between the S2-side turn portion T2 and the S3-side turn portion T3 without setting the width Wt in the radial direction of each turn portion to be smaller than the width Ws in the radial direction of the corresponding slot accommodation portion S.

In addition, a gap is provided in the radial direction between the S1-side turn portion T1 and the S2-side turn portion T2, and a gap is provided in the radial direction between the S3-side turn portion T3 and the S4-side turn portion T4.

Therefore, in the unit coils in the present embodiment, even though the gap Gt3 is provided in the radial direction between the S2-side turn portion T2 and the S3-side turn portion T3, the sectional area of each turn portion along a direction perpendicular to the current direction does not become smaller than the sectional area of the corresponding slot accommodation portion along a direction perpendicular to the current direction.

In the present embodiment, a gap is provided in the radial direction between the S1-side turn portion T1 and the S2-side turn portion T2, and a gap is provided in the radial direction between the S3-side turn portion T3 and the S4-side turn portion T4. However, these gaps may not be provided.

In the rotating electric machine in the present embodiment, the unit coils are configured such that the gap Gt3 in the radial direction is provided between the S2-side turn portion T2 and the S3-side turn portion T3 which extend toward different sides in the circumferential direction, and an insulation member can be provided between the S2-side turn portion T2 and the S3-side turn portion T3 which have different phases, without providing a gap between the second slot accommodation portion S2 and the third slot accommodation portion S3. Therefore, insulation performance of the turn portions is improved and insulation reliability of the coil end part on the non-wire-connection side is improved.

In addition, the sectional area of each turn portion along a direction perpendicular to the current direction does not become smaller than the sectional area of the corresponding slot accommodation portion. Therefore, output reduction of the rotating electric machine due to copper loss can be prevented.

Embodiment 4

Figure 22:
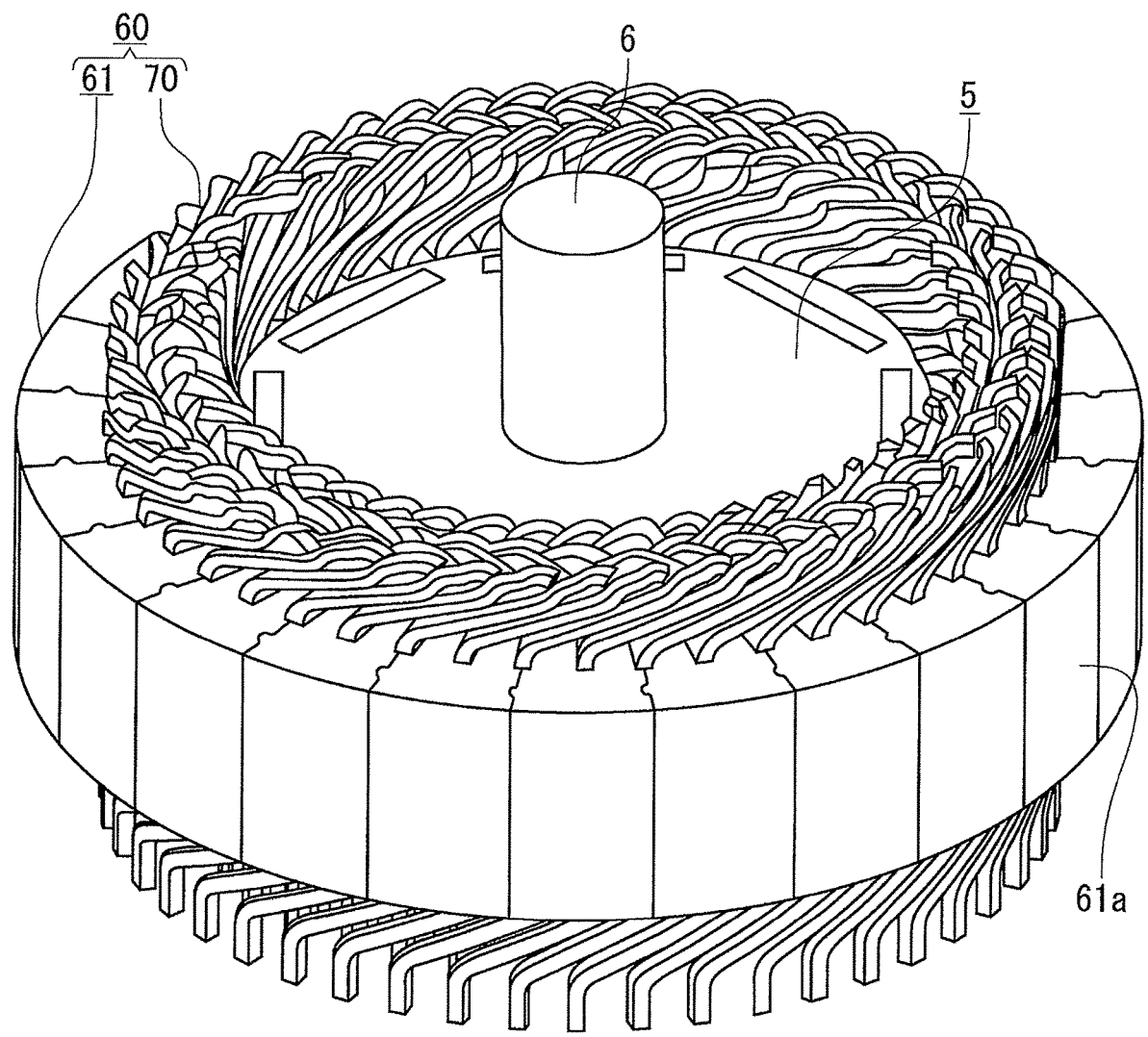
FIG. 22 is a schematic perspective view showing an armature and a rotor which are a major part of a rotating electric machine according to embodiment 4 of the present invention.

FIG. 22 is a schematic perspective view showing an armature and a rotor which are a major part of a rotating electric machine according to embodiment 4 of the present invention.

The rotating electric machine in the present embodiment is the same as the rotating electric machine 100 in embodiment 1 except for difference in the structure of an armature 60.

As shown in FIG. 22, the armature 60 in the present embodiment also includes an armature core 61 and an armature winding 70.

The armature core 61 is formed from core blocks 61a obtained by dividing the armature core 61 into twenty-four parts along the circumferential direction.

Figure 23:
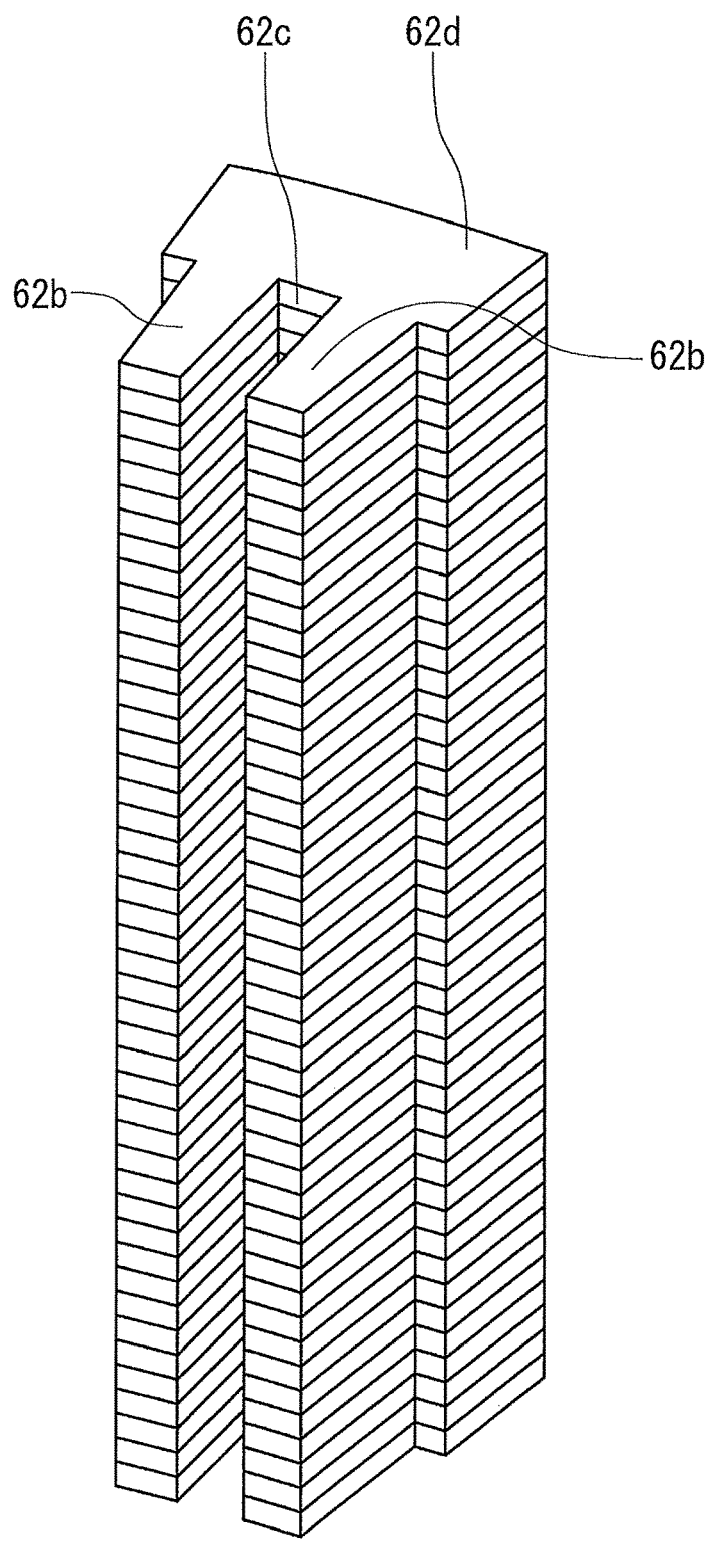
FIG. 23 is a schematic perspective view of a core block forming an armature core of the armature according to embodiment 4 of the present invention.

FIG. 23 is a schematic perspective view of a core block forming the armature core of the armature according to embodiment 4 of the present invention.

As shown in FIG. 23, the core block 61a is manufactured by integrally stacking a predetermined number of core block pieces made of electromagnetic steel sheets, and includes: a core back forming portion 62d having an arc-shaped axial-direction surface; and two teeth 62b protruding inward in the radial direction from the inner circumferential wall surface of the core back forming portion 62d.

That is, the armature core 61 is formed by arranging the core blocks 61a in an annular shape with the end surfaces of the core back forming portions 62d in contact with each other. Thus, the core back forming portions 62d are continuously arranged to form the core back portion of the armature core 61.

In addition, slots 62c are formed between two teeth 62b of each core block 61a and between respective teeth 62b of the core blocks 61a adjacent to each other in the circumferential direction.

Each tooth 62b has such a tapered shape that the width in the circumferential direction gradually decreases inward in the radial direction. Therefore, each slot 62c has a rectangular shape in a cross section as seen from the axial direction.

Figure 24:
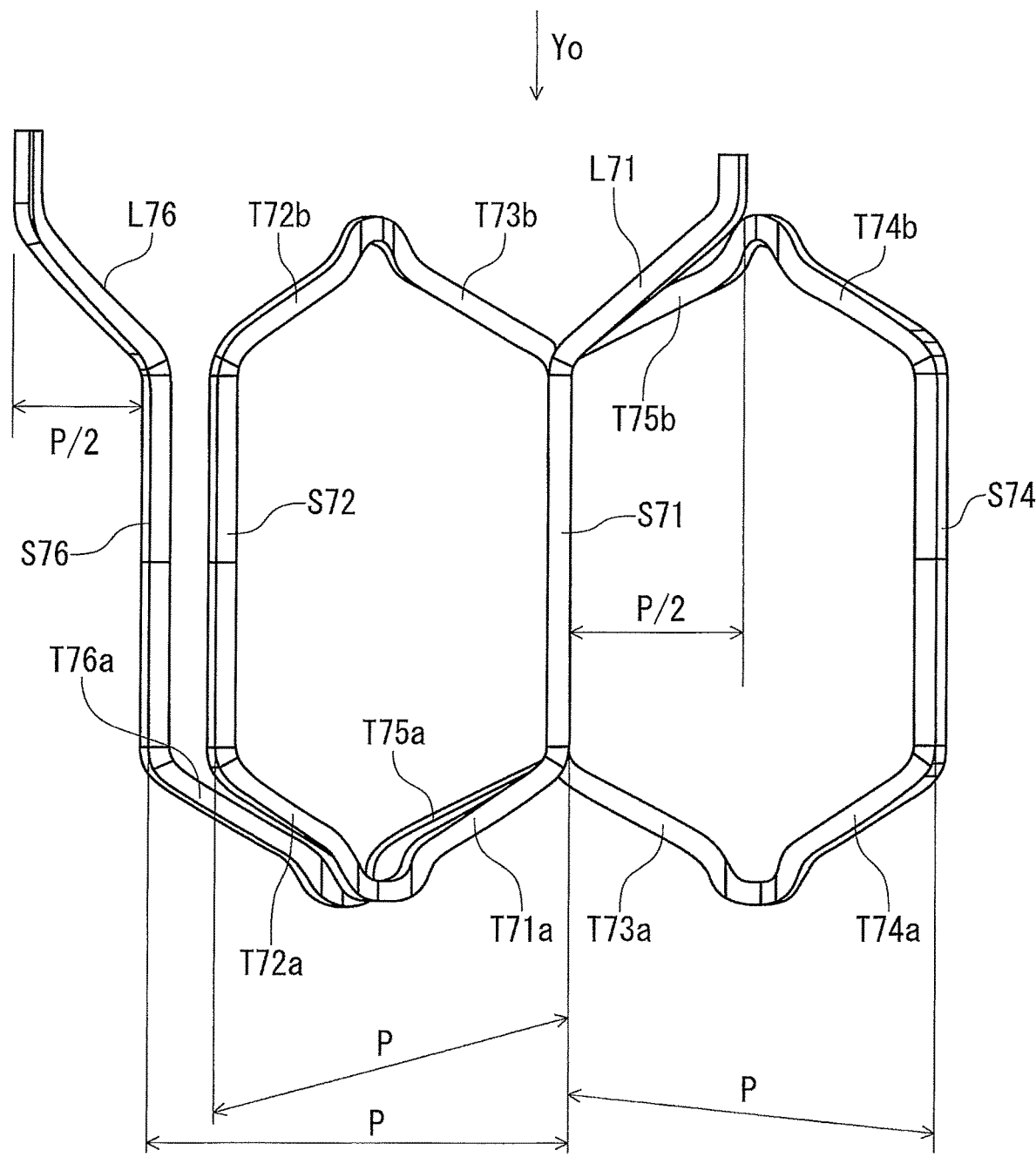
FIG. 24 is a schematic front view of the unit coil composing an armature winding of the rotating electric machine according to embodiment 4 of the present invention.

FIG. 24 is a schematic front view of a unit coil composing the armature winding in the rotating electric machine according to embodiment 4 of the present invention.

Figure 25:
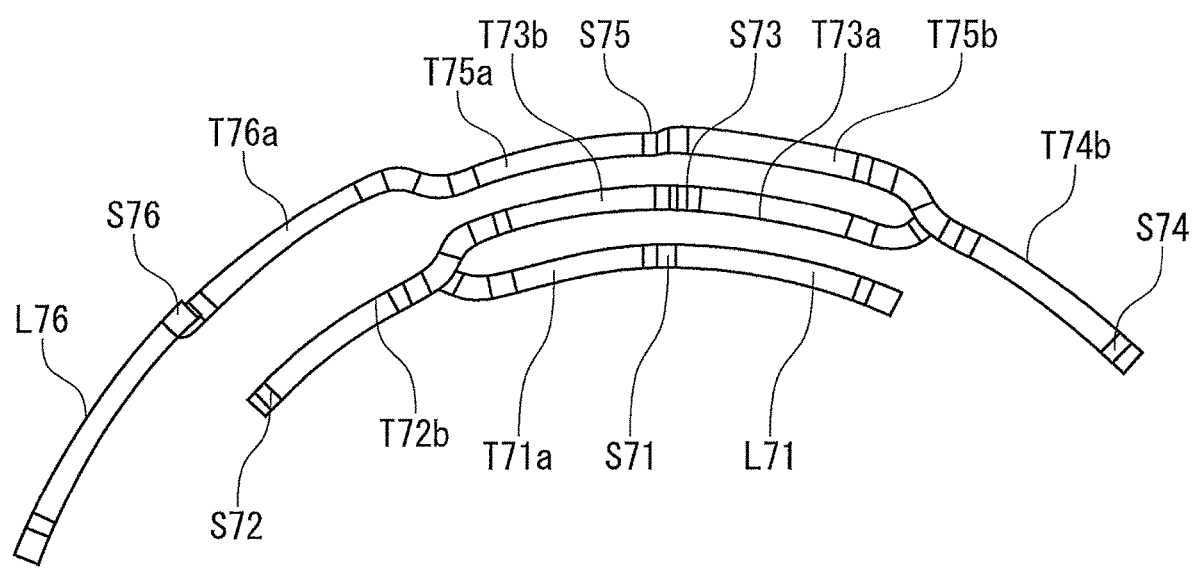
FIG. 25 is a schematic view of the unit coil in FIG. 24 as seen from the direction of arrow Yo.

FIG. 25 is a schematic view of the unit coil in FIG. 24 as seen from the direction of arrow Yo.

Figure 26:
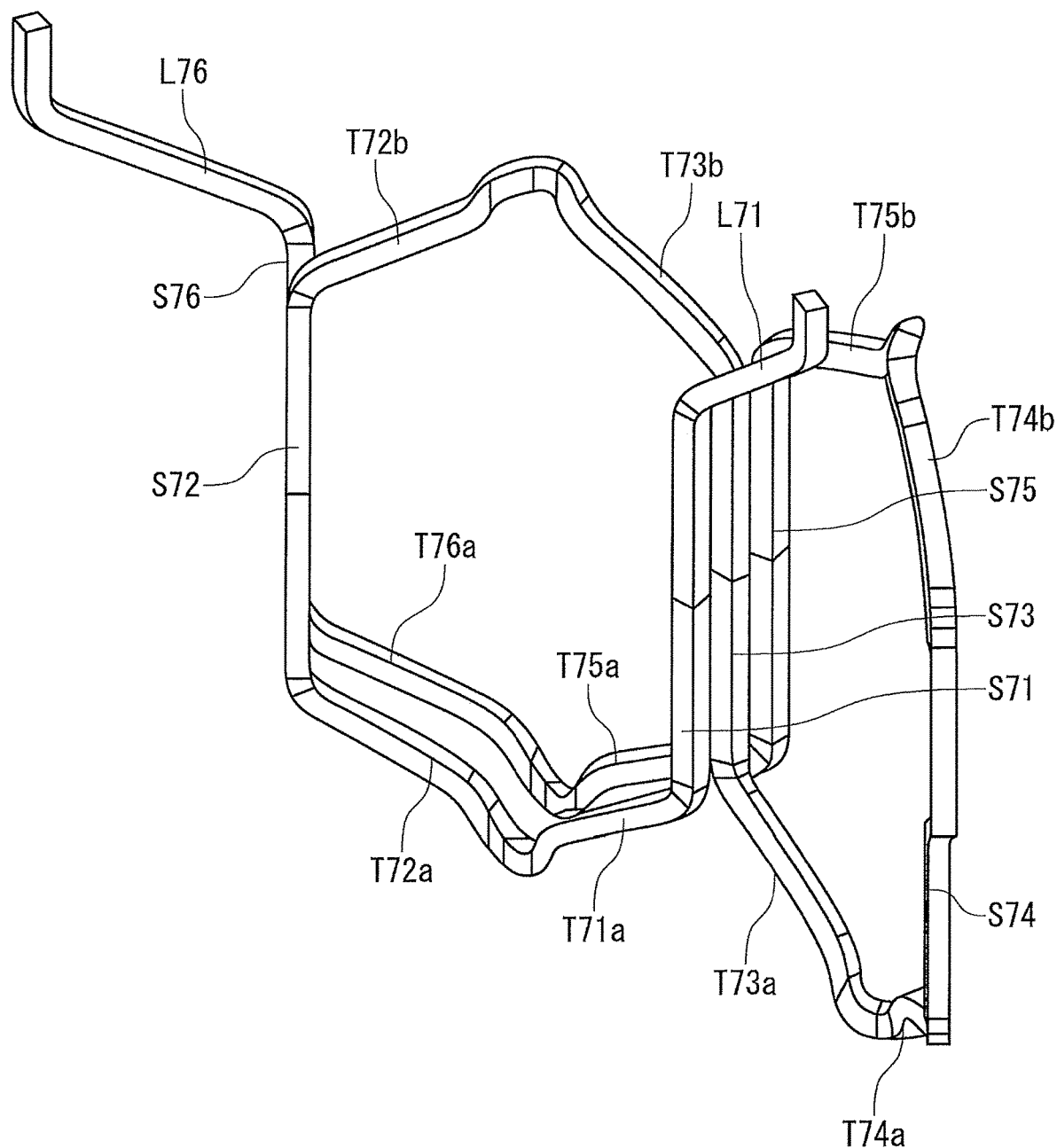
FIG. 26 is a schematic perspective view of the unit coil composing the armature winding of the rotating electric machine according to embodiment 4 of the present invention.

FIG. 26 is a schematic perspective view of the unit coil composing the armature winding in the rotating electric machine according to embodiment 4 of the present invention.

As shown in FIG. 24 to FIG. 26, a unit coil 71 in the present embodiment has such a shape that two hexagonal portions are arranged side by side in the width direction, and is formed by bending one conductive wire which has a rectangular sectional shape and which is continuous without connection portions and is made from a copper wire or an aluminum wire coated with an enamel resin so as to be insulated, for example.

The armature winding 70 is formed by continuously arranging forty-eight unit coils 71 in series along the circumferential direction.

The armature 60 is formed by inserting the core blocks 61a into the armature winding 70 from the outer side in the radial direction.

The unit coil 71 has six slot accommodation portions having a straight-bar shape and to be accommodated in the slots 12c, that is, has a first slot accommodation portion S71 for a first layer, a second slot accommodation portion S72 for a second layer, a third slot accommodation portion S73 for a third layer, a fourth slot accommodation portion S74 for a fourth layer, a fifth slot accommodation portion S75 for a fifth layer, and a sixth slot accommodation portion S76 for a sixth layer.

The first slot accommodation portion S71, the third slot accommodation portion S73, and the fifth slot accommodation portion S75 are located at the same position in the circumferential direction.

The second slot accommodation portion S72 is separated toward one side in the circumferential direction from the first slot accommodation portion S71 by a six-slot angular interval corresponding to one magnetic pole pitch P, and the sixth slot accommodation portion S76 is separated toward one side in the circumferential direction from the fifth slot accommodation portion S75 by a six-slot angular interval corresponding to one magnetic pole pitch P.

The fourth slot accommodation portion S74 is separated toward the other side in the circumferential direction from the third slot accommodation portion S73 by a six-slot angular interval corresponding to one magnetic pole pitch P.

The unit coil 71 has continuous turn portions which, without connection portions, respectively connect integrally: the first slot accommodation portion S71 and the second slot accommodation portion S72; the second slot accommodation portion S72 and the third slot accommodation portion S73; the third slot accommodation portion S73 and the fourth slot accommodation portion S74; the fourth slot accommodation portion S74 and the fifth slot accommodation portion S75; and the fifth slot accommodation portion S75 and the sixth slot accommodation portion S76.

The unit coil 71 has two leg portions L (S71-side leg portion L71, S76-side leg portion L76) respectively protruding from the first and sixth slot accommodation portions S71, S76 and bent toward outer sides opposite to each other in the circumferential direction.

A terminal part of the S71-side leg portion L71 protruding from the first slot accommodation portion S71 is separated toward the other side in the circumferential direction from the first slot accommodation portion S71 by a distance corresponding to a half magnetic pole pitch (=P/2). A terminal part of the S76-side leg portion L76 protruding from the sixth slot accommodation portion S76 is separated toward one side in the circumferential direction from the sixth slot accommodation portion S76 by a distance corresponding to a half magnetic pole pitch (=P/2).

The terminal part of the S71-side leg portion L71 and the terminal part of the S76-side leg portion L76 are connected to another unit coil, a neutral point, or a power feed portion by joining means such as welding.

The turn portion between the first slot accommodation portion S71 and the second slot accommodation portion S72 is formed from an S71-side first turn portion T71a on the first slot accommodation portion S71 side and an S72-side first turn portion T72a on the second slot accommodation portion S72, which are located on the lower side in the drawings of FIG. 24 and FIG. 26.

The turn portion between the second slot accommodation portion S72 and the third slot accommodation portion S73 is formed from an S72-side second turn portion T72b on the second slot accommodation portion S72 side and an S73-side second turn portion T73b on the third slot accommodation portion S73 side, which are located on the upper side in the drawings of FIG. 24 and FIG. 26.

The turn portion between the third slot accommodation portion S73 and the fourth slot accommodation portion S74 is formed from an S73-side first turn portion T73a on the third slot accommodation portion S73 side and an S74-side first turn portion T74a on the fourth slot accommodation portion S74 side, which are located on the lower side in the drawings of FIG. 24 and FIG. 26.

The turn portion between the fourth slot accommodation portion S74 and the fifth slot accommodation portion S75 is formed from an S74-side second turn portion T74b on the fourth slot accommodation portion S74 side and an S75-side second turn portion T75b on the fifth slot accommodation portion S75 side, which are located on the upper side in the drawings of FIG. 24 and FIG. 26.

The turn portion between the fifth slot accommodation portion S75 and the sixth slot accommodation portion S76 is formed from an S75-side first turn portion T75a on the fifth slot accommodation portion S75 and an S76-side first turn portion T76a on the sixth slot accommodation portion S76, which are located on the lower side in the drawings of FIG. 24 and FIG. 26.

The S72-side second turn portion T72b, the S73-side second turn portion T73b, the S74-side second turn portion T74b, and the S75-side second turn portion T75b which are located on the upper side in the drawings of FIG. 24 and FIG. 26 are located on a side where the S71-side leg portion L71 and the S76-side leg portion L76 are located. Thus, these turn portions form a wire-connection-side coil end of the unit coil 71, together with the S71-side leg portion L71 and the S76-side leg portion L76.

The S71-side first turn portion T71a, the S72-side first turn portion T72a, the S73-side first turn portion T73a, the S74-side first turn portion T74a, the S75-side first turn portion T75a, and the S76-side first turn portion T76a which are located on the lower side in the drawings of FIG. 24 and FIG. 26, form a non-wire-connection-side coil end of the unit coil 71.

Figure 27:
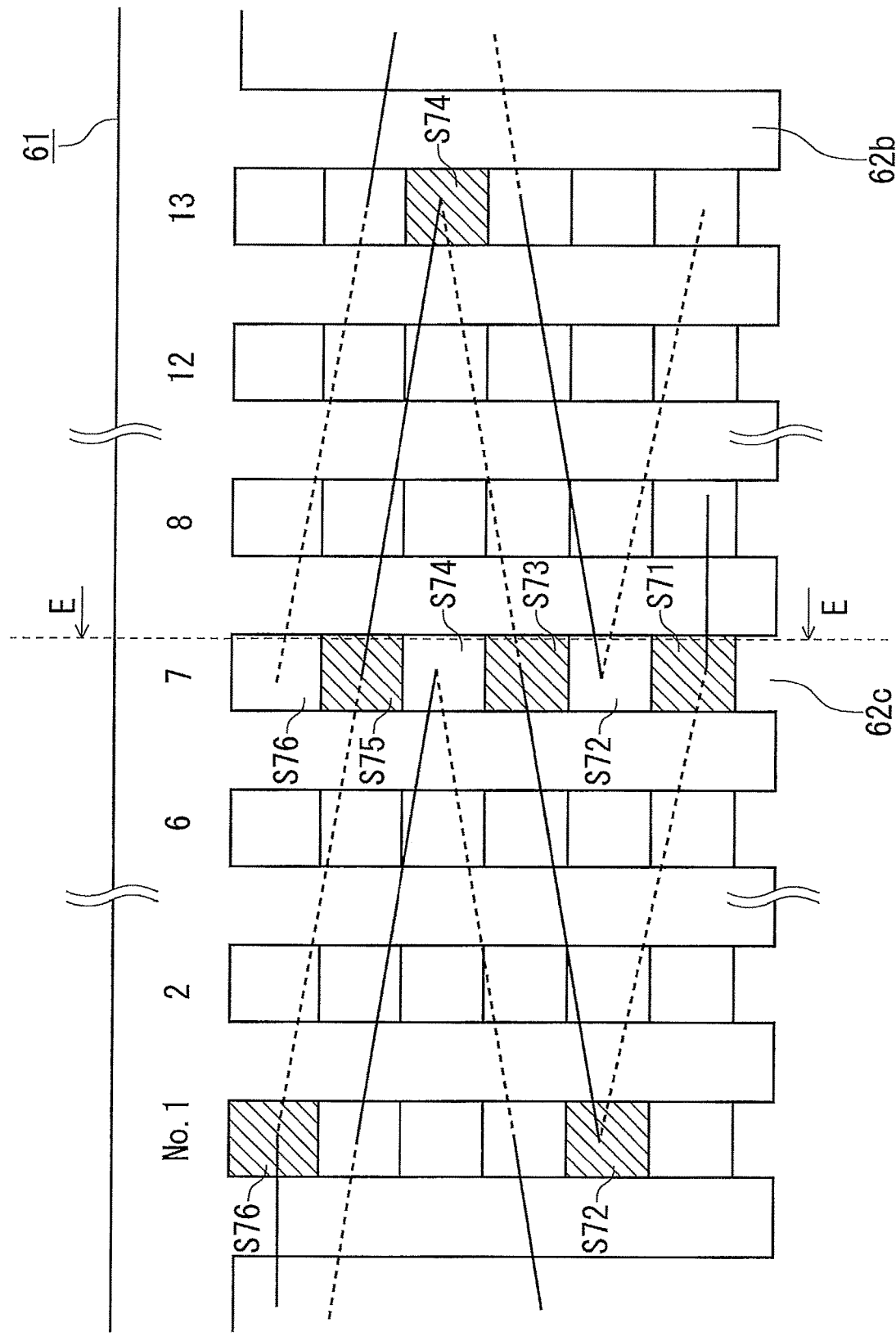
FIG. 27 is a schematic plan view on the wire-connection-side coil end side, showing a plurality of the unit coils arranged in slots of the armature core in the armature according to embodiment 4 of the present invention.

FIG. 27 is a schematic plan view on the wire-connection-side coil end side, showing a plurality of the unit coils arranged in the slots of the armature core, in the armature according to embodiment 4 of the present invention.

In FIG. 27, for convenience of description, the teeth 62b and the slots 62c arranged in an annular shape in the armature core 61 are developed to be arranged in a straight line. In addition, for convenience of description, the slots 62c are serially numbered from left to right in the drawing.

FIG. 27 is a view of the unit coils 71 arranged in the armature core 61, as seen from the wire-connection-side coil end side as indicated by arrow Yo in FIG. 24.

In FIG. 27, the leg portions and the turn portions at the wire-connection-side coil end which extend from the respective slot accommodation portions as indicated by solid lines, are on the front side of the drawing, and the turn portions at the non-wire-connection-side coil end which extend from the respective slot accommodation portions as indicated by a dotted line, are on the back side of the drawing.

As shown in FIG. 27, in the armature 60 in the present embodiment, for example, the unit coil 71 of which the first slot accommodation portion S71, the third slot accommodation portion S73, and the fifth slot accommodation portion S75 are located in the seventh slot 62c, is provided such that the second slot accommodation portion S72 and the sixth slot accommodation portion S76 thereof are located in the first slot 62c separated toward one side in the circumferential direction from the seventh slot 62c by a six-slot angular interval corresponding to one magnetic pole pitch P, and the fourth slot accommodation portion S74 thereof is located in the thirteenth slot 62c separated toward the other side in the circumferential direction from the seventh slot 62c by a six-slot angular interval corresponding to one magnetic pole pitch P.

Further, in the seventh slot 62c, the second slot accommodation portion S72 and the sixth slot accommodation portion S76 of another unit coil 71 on the other side in the circumferential direction are located, and the fourth slot accommodation portion S74 of another unit coil 71 on one side in the circumferential direction is located.

That is, in the seventh slot 62c, the slot accommodation portions are arranged in the order of sixth slot accommodation portion S76, fifth slot accommodation portion S75, fourth slot accommodation portion S74, third slot accommodation portion S73, second slot accommodation portion S72, and then first slot accommodation portion S71, from the core back portion side toward the opening side of the armature core 61.

Also in the other slots 62c, the slot accommodation portions are arranged in the same manner.

Figure 28:
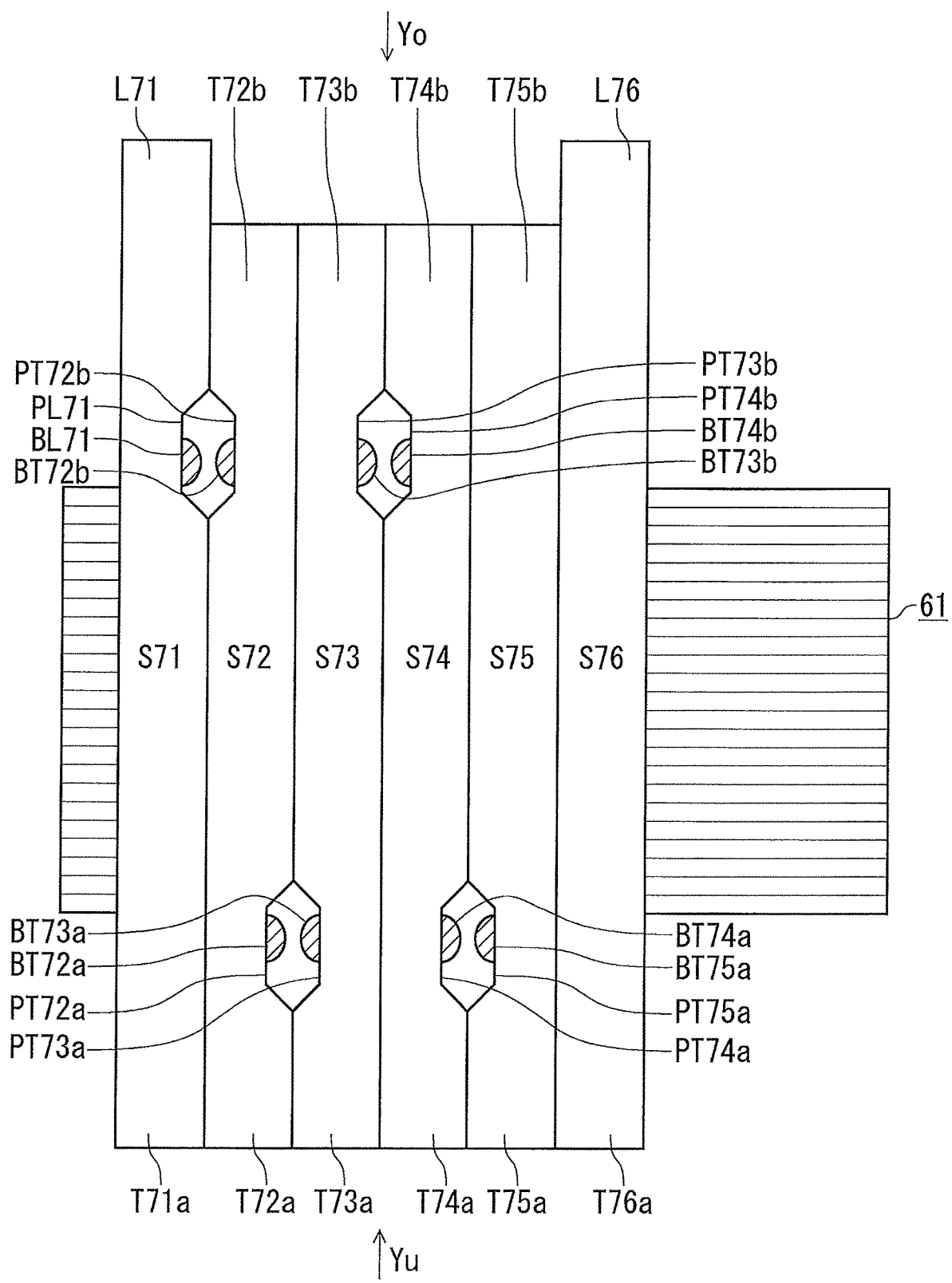
FIG. 28 is a schematic view of an E-E cross section of the armature in FIG. 27.

FIG. 28 is a schematic view of an E-E cross section of the armature in FIG. 27.

FIG. 29 is a schematic view (a) on the wire-connection-side coil end side as seen from the direction of arrow Yo and a schematic view (b) on the non-wire-connection-side coil end side as seen from the direction of arrow Yu, in FIG. 28.

FIG. 28 also shows the armature core 61 in which the unit coils 71 are arranged. The upper parts extending from the armature core 61 are the leg portions and the turn portions on the wire-connection-side coil end side of the unit coils, and the lower parts extending from the armature core 61 are the turn portions on the non-wire-connection-side coil end side of the unit coils.

FIG. 28 does not show bulging portions other than bulging portions located at recesses described later.

FIG. 28 is a view as seen from the right in the drawing of FIG. 27. Therefore, in FIG. 28, the S71-side leg portion L71, the S72-side second turn portion T72b, the S75-side second turn portion T75b, the S72-side first turn portion T72a, the S73-side first turn portion T73a, and the S76-side first turn portion T76a are all bent frontward in the drawing.

In addition, the S73-side second turn portion T73b, the S74-side second turn portion T74b, the S76-side leg portion L76, the S71-side first turn portion T71a, the S74-side first turn portion T74a, and the S75-side first turn portion T75a are all bent backward in the drawing.

That is, as shown in FIG. 28 and FIG. 29(a), at the wire-connection-side coil end, the S71-side leg portion L71 and the S72-side second turn portion T72b adjacent to each other are bent in the same frontward direction in the drawing, and the S73-side second turn portion T73b and the S74-side second turn portion T74b are bent in the same backward direction in the drawing.

A recess PL71 and a recess PT72b are formed in surfaces opposed to each other at the bent parts of the S71-side leg portion L71 and the S72-side second turn portion T72b which are bent toward the same side in the circumferential direction and overlap each other in the radial direction, and the recess PL71 and the recess PT72b are opposed to each other in the radial direction. A recess PT73b and a recess PT74b are formed in surfaces opposed to each other at the bent parts of the S73-side second turn portion T73b and the S74-side second turn portion T74b which are bent toward the same side in the circumferential direction and overlap each other in the radial direction, and the recess PT73b and the recess PT74b are opposed to each other in the radial direction.

As shown in FIG. 28 and FIG. 29(b), at the non-wire-connection-side coil end, the S72-side first turn portion T72a and the S73-side first turn portion T73a adjacent to each other are bent in the same frontward direction in the drawing, and the S74-side first turn portion T74a and the S75-side first turn portion T75a are bent in the same backward direction in the drawing.

A recess PT72a and a recess PT73a are formed in surfaces opposed to each other at the bent parts of the S72-side first turn portion T72a and the S73-side first turn portion T73a which are bent toward the same side in the circumferential direction and overlap each other in the radial direction, and the recess PT72a and the recess PT73a are opposed to each other in the radial direction. A recess PT74a and a recess PT75a are formed in surfaces opposed to each other at the bent parts of the S74-side first turn portion T74a and the S75-side first turn portion T75a which are bent toward the same side in the circumferential direction and overlap each other in the radial direction, and the recess PT74a and the recess PT75a are opposed to each other in the radial direction.

In the present embodiment, the recess formed in each opposed surface is a recess provided at, for example, a corner portion between a bent-side surface and the opposed surface at the bent part of the leg portion or the turn portion.

In the armature in the present embodiment, in the unit coils 71, the recesses are formed in surfaces opposed to each other at the bent parts, of a pair of the leg portion and the turn portion and a pair of the turn portions that respectively extend toward the wire-connection-side coil end side from the respective coil accommodation portions and overlap each other in the radial direction.

In addition, the recesses are formed in surfaces opposed to each other at the bent parts of a pair of the turn portions that extend toward the non-wire-connection-side coil end side from the respective coil accommodation portions and overlap each other in the radial direction.

That is, the recesses are formed in the radially outer side surfaces at the bent parts of the S71-side leg portion L71, the S72-side first turn portion T72a, the S73-side second turn portion T73b, and the S74-side first turn portion T74a.

In addition, the recesses are formed in the radially inner side surfaces at the bent parts of the S72-side second turn portion T72b, the S73-side first turn portion T73a, the S74-side second turn portion T74b, and the S75-side first turn portion T75a.

Therefore, of the bulging portions in the radial direction occurring on the radial-direction surfaces at the bent parts, bulging portions BL71, BT72b, BT73b, BT74b, BT72a, BT73a, BT74a, BT75a of opposed surfaces overlapping each other occur in respective recesses PL71, PT72b, PT73b, PT74b, PT72a, PT73a, PT74a, PT75a, and thus do not protrude outward of the respective opposed surfaces.

As shown in FIG. 29, the bulging portions in the radial direction occurring at the bent parts of, a pair of the leg portion and the turn portion and a pair of the turn portions that are adjacent to each other but extend toward different sides in the circumferential direction from the coil accommodation portions, are shifted from each other in the circumferential direction and thus do not overlap each other in the radial direction.

That is, in the armature in the present embodiment, gaps in the radial direction can be reduced for not only a pair of the leg portion and the turn portion and a pair of the turn portions that respectively extend toward different sides in the circumferential direction from the coil accommodation portion, but also a pair of the leg portion and the turn portion and a pair of the turn portions that respectively extend toward the same side in the circumferential direction from the coil accommodation portion. Therefore, gaps in the radial direction between the slot accommodation portions arranged in each slot can be reduced and the space factor of coils is improved, whereby size reduction and output increase of the rotating electric machine can be achieved.

In the unit coil in the present embodiment, the recess is formed at a corner portion between the bent-side surface and the opposed surface, and it is not necessary to reduce the thickness of the entire bent part or restrict occurrence of a bulging portion from outside at the time of bending. Therefore, damage on the insulation coat can be reduced and deterioration in insulation performance of the armature winding can be prevented.

The unit coil in the present embodiment is formed from one conductive wire and has two hexagonal portions. Therefore, the number of welding parts can be decreased, whereby productivity is improved.

In addition, the number of layers of turn portions in the axial direction is one. Therefore, the height of each coil end can be reduced and thus the rotating electric machine can be downsized.

Embodiment 5

Figure 30:
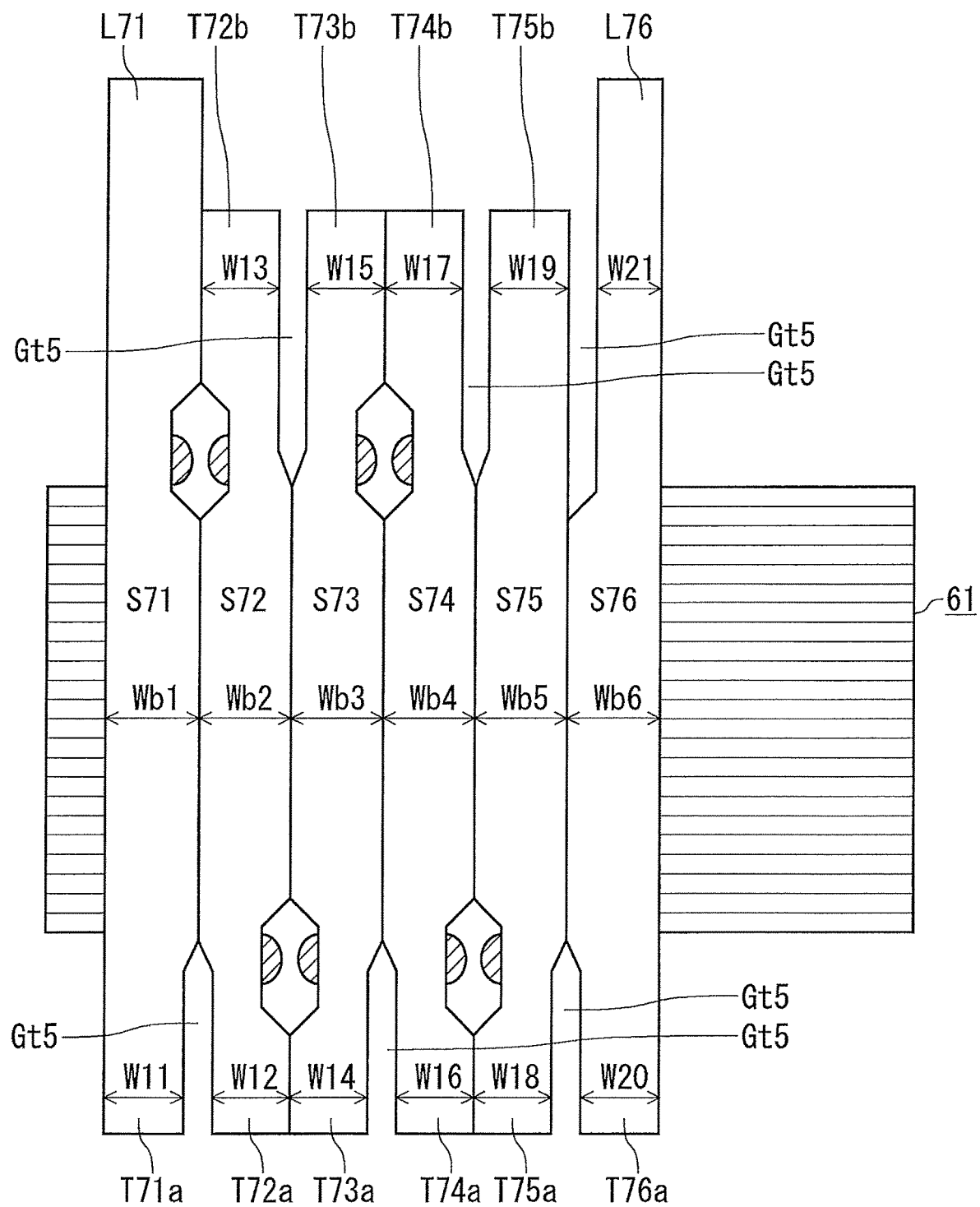
FIG. 30 is a schematic sectional view in the circumferential direction of unit coils mounted to a slot in a rotating electric machine according to embodiment 5 of the present invention.

FIG. 30 is a schematic sectional view in the circumferential direction of unit coils mounted to a slot in a rotating electric machine according to embodiment 5 of the present invention.

FIG. 30 corresponds to FIG. 28 showing the armature in embodiment 4.

In the rotating electric machine in the present embodiment, the structure of unit coils, in particular, the structures of the wire-connection-side coil end and the non-wire-connection-side coil end, are different from those of the unit coils in embodiment 4, but the sides to which the turn portions and the leg portions extend in the circumferential direction, and the positions of the recesses, are the same as in the unit coils in embodiment 4, and the same effect as that of the rotating electric machine in embodiment 4 is provided.

As shown in FIG. 30, in the unit coils in the present embodiment, a width W11 in the radial direction of the S71-side first turn portion T71a extending from the first slot accommodation portion in the first layer is smaller than a width Wb1 in the radial direction of the first slot accommodation portion S71.

In addition, a width W12 in the radial direction of the S72-side first turn portion T72a and a width W13 in the radial direction of the S72-side second turn portion T72b extending from the second slot accommodation portion S72 in the second layer are smaller than a width Wb2 in the radial direction of the second slot accommodation portion S72.

In addition, a width W14 in the radial direction of the S73-side first turn portion T73a and a width W15 in the radial direction of the S73-side second turn portion T73b extending from the third slot accommodation portion S73 in the third layer are smaller than a width Wb3 in the radial direction of the third slot accommodation portion S73.

In addition, a width W16 in the radial direction of the S74-side first turn portion T74a and a width W17 in the radial direction of the S74-side second turn portion T74b extending from the fourth slot accommodation portion S74 in the fourth layer are smaller than a width Wb4 in the radial direction of the fourth slot accommodation portion S74.

In addition, a width W18 in the radial direction of the S75-side first turn portion T75a and a width W19 in the radial direction of the S75-side second turn portion T75b extending from the fifth slot accommodation portion S75 in the fifth layer are smaller than a width Wb5 in the radial direction of the fifth slot accommodation portion S75.

In addition, a width W20 in the radial direction of the S76-side first turn portion T76a and a width W21 in the radial direction of the S76-side leg portion L76 extending from the sixth slot accommodation portion S76 in the sixth layer are smaller than a width Wb6 in the radial direction of the sixth slot accommodation portion S76.

That is, in the unit coils in the present embodiment, the width in the radial direction of each of the leg portions and the turn portions is set to be smaller than the width in the radial direction of the corresponding slot accommodation portion from which the leg portion or the turn portion extends. Thus, at the non-wire-connection-side coil end, gaps Gt5 are provided between: the S71-side first turn portion T71a and the S72-side first turn portion T72a; the S73-side first turn portion T73a and the S74-side first turn portion T74a; and the S75-side first turn portion T75a and the S76-side first turn portion T76a, which respectively extend toward different sides in the circumferential direction and are adjacent to each other in the radial direction when set in the slot.

In addition, also at the wire-connection-side coil end, gaps Gt5 are provided between: the S72-side second turn portion T72b and the S73-side second turn portion T73b; the S74-side second turn portion T74b and the S75-side second turn portion T75b; and the S75-side second turn portion T75b and the S76-side leg portion L76, which respectively extend toward different sides in the circumferential direction and are adjacent to each other in the radial direction when set in the slot.

In the rotating electric machine in the present embodiment, since the unit coils have the structure as described above, insulation members can be provided in the gaps Gt5, whereby insulation performance at the coil ends is further improved.

Embodiment 6

Figure 31:
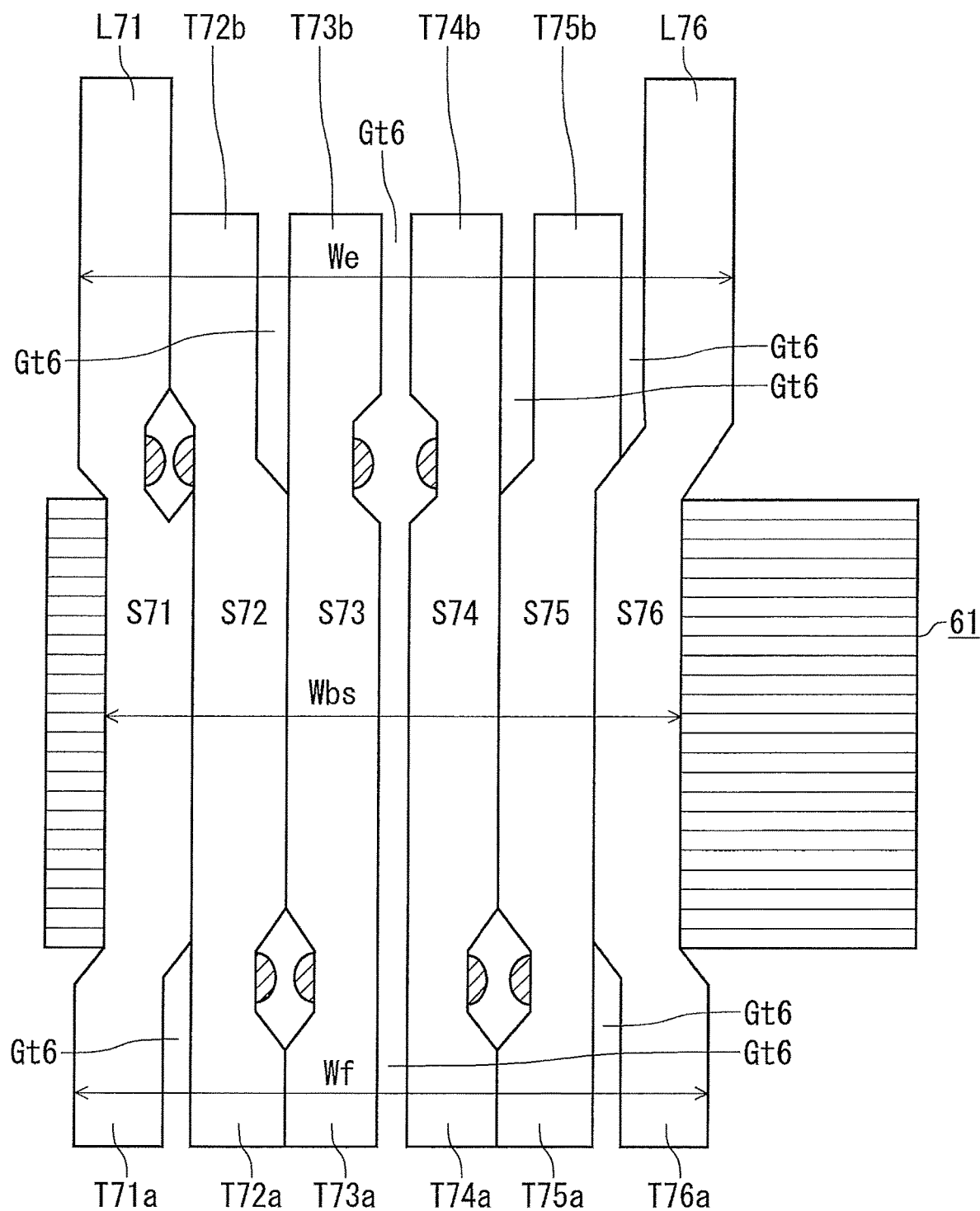
FIG. 31 is a schematic sectional view in the circumferential direction of unit coils mounted to a slot in a rotating electric machine according to embodiment 6 of the present invention.

FIG. 31 is a schematic sectional view in the circumferential direction of unit coils mounted to a slot in a rotating electric machine according to embodiment 6 of the present invention.

FIG. 31 corresponds to FIG. 28 showing the armature in embodiment 4.

In the rotating electric machine in the present embodiment, the structure of unit coils, in particular, the structures of the wire-connection-side coil end and the non-wire-connection-side coil end, are different from those of the unit coils in embodiment 4, but the sides to which the turn portions and the leg portions extend in the circumferential direction, and the positions of the recesses, are the same as in the unit coils in embodiment 4, and the same effect as that of the rotating electric machine in embodiment 4 is provided.

As shown in FIG. 31, in the unit coils in the present embodiment, the S71-side leg portion L71 and the S71-side first turn portion T71a extending from the first slot accommodation portion S71 in the first layer are positioned inward in the radial direction with respect to the first slot accommodation portion S71, and the S72-side second turn portion T72b extending from the second slot accommodation portion S72 in the second layer is positioned inward in the radial direction with respect to the second slot accommodation portion S72.

In addition, the S76-side leg portion L76 and the S76-side first turn portion T76a extending from the sixth slot accommodation portion S76 in the sixth layer are positioned outward in the radial direction with respect to the sixth slot accommodation portion S76, and the S75-side second turn portion T75b extending from the fifth slot accommodation portion S75 in the fifth layer is positioned outward in the radial direction with respect to the fifth slot accommodation portion S75.

In addition, a gap is provided between the third slot accommodation portion S73 in the third layer and the fourth slot accommodation portion S74 in the fourth layer.

That is, an interval We in the radial direction between the leg portions L71 and L76 at the wire-connection-side coil end and an interval Wf in the radial direction between the turn portions T71a and T76a at the non-wire-connection-side coil end are greater than a width Wbs in the radial direction of the part in which all the slot accommodation portions are stacked.

Thus, in the unit coil in the present embodiment, at the wire-connection-side coil end, gaps Gt6 are provided in the radial direction between: the S72-side second turn portion T72b and the S73-side second turn portion T73b; the S74-side second turn portion T74b and the S75-side second turn portion T75b; the S75-side second turn portion T75b and the S76-side leg portion L76; and the S73-side second turn portion T73b and the S74-side second turn portion T74b, but the sectional area of each of the turn portions and the leg portions along a direction perpendicular to the current direction is not smaller than the sectional area of each slot accommodation portion.

In addition, at the non-wire-connection-side coil end, gaps Gt6 are provided in the radial direction between: the S71-side first turn portion T71a and the S72-side first turn portion T72a; the S75-side first turn portion T75a and the S76-side first turn portion T76a; and the S73-side first turn portion T73a and the S74-side first turn portion T74a, but the sectional area of each turn portion along a direction perpendicular to the current direction is not smaller than the sectional area of each slot accommodation portion.

In the rotating electric machine in the present embodiment, the unit coils are configured such that the gaps Gt6 are provided at least between the leg portion and the turn portion and between the turn portions, which respectively extend toward different sides in the circumferential direction. Therefore, insulation members can be provided in the gaps Gt6, whereby insulation performance of the coil ends is further improved.

In addition, the sectional areas of the leg portions and the turn portions do not differ from the sectional areas of the slot accommodation portions. Therefore, output reduction of the rotating electric machine due to copper loss can be prevented.

In addition, in the unit coils, the same recesses are provided at the same bent parts as in the unit coils in embodiment 4, and the width Wbs in the radial direction of the part in which all the slot accommodation portions are stacked can be reduced. Therefore, the space factor of coils can be improved, whereby size reduction and output increase of the rotating electric machine can be achieved.

It is noted that, within the scope of the present invention, the above embodiments may be freely combined with each other, or each of the above embodiments may be modified or simplified as appropriate.

INDUSTRIAL APPLICABILITY

The rotating electric machine of the present invention can achieve size reduction and output increase, and therefore is applicable to industrial devices that require performance enhancement.

The invention claimed is:

1. A rotating electric machine comprising an armature and a rotor, the armature including an armature core and an armature winding formed by arranging a plurality of unit coils along a circumferential direction, wherein
each unit coil includes: a plurality of slot accommodation portions located in different slots; a turn portion extending in a bent manner from each slot accommodation portion and connecting the slot accommodation portions to each other; and a leg portion extending in a bent manner from each slot accommodation portion, and
the plurality of slot accommodation portions are stacked in a radial direction in the slots, and recesses dented in the radial direction are formed in surfaces only opposed to each other at bent parts of a pair of turn portions or bent parts of the turn portion and the leg portion of slot accommodation portions adjacent to each other in the radial direction, that extend in a bent manner toward the same side in the circumferential direction.

2. The rotating electric machine according to claim 1, wherein
each unit coil includes one partial coil and another partial coil that overlap each other in the radial direction,
the one partial coil includes a first slot accommodation portion for a first layer on an inner side in the radial direction, and a fourth slot accommodation portion for a fourth layer on an outer side in the radial direction, the fourth slot accommodation portion being connected to the first slot accommodation portion via the turn portion,
the other partial coil includes a second slot accommodation portion for a second layer and a third slot accommodation portion for a third layer, the third slot accommodation portion being connected to the second slot accommodation portion via the turn portion,
a side to which the turn portion on the first slot accommodation portion side extends in a bent manner is the same as a side to which the turn portion on the second slot accommodation portion side extends in a bent manner, and the turn portion on the first slot accommodation portion side and the turn portion on the second slot accommodation portion side are adjacent to each other in the radial direction,
a side to which the turn portion on the fourth slot accommodation portion side extends in a bent manner is the same as a side to which the turn portion on the third slot accommodation portion side extends in a bent manner, and the turn portion on the fourth slot accommodation portion side and the turn portion on the third slot accommodation portion side are adjacent to each other in the radial direction,
recesses dented in the radial direction are formed in surfaces opposed to each other at bent parts of the turn portion on the first slot accommodation portion side and the turn portion on the second slot accommodation portion side,
recesses dented in the radial direction are formed in surfaces opposed to each other at bent parts of the turn portion on the fourth slot accommodation portion side and the turn portion on the third slot accommodation portion side,
a side to which the leg portion on the first slot accommodation portion side extends in a bent manner is the same as a side to which the leg portion on the second slot accommodation portion side extends in a bent manner, and the leg portion on the first slot accommodation portion side and the leg portion on the second slot accommodation portion side are adjacent to each other in the radial direction,
a side to which the leg portion on the fourth slot accommodation portion side extends in a bent manner is the same as a side to which the leg portion on the third slot accommodation portion side extends in a bent manner, and the leg portion on the fourth slot accommodation portion side and the leg portion on the third slot accommodation portion side are adjacent to each other in the radial direction,
recesses dented in the radial direction are formed in surfaces opposed to each other at bent parts of the leg portion on the first slot accommodation portion side and the leg portion on the second slot accommodation portion side, and
recesses dented in the radial direction are formed in surfaces opposed to each other at bent parts of the leg portion on the fourth slot accommodation portion side and the leg portion on the third slot accommodation portion side.

3. The rotating electric machine according to claim 2, wherein
a width in the radial direction of the turn portion on the second slot accommodation portion side is smaller than a width in the radial direction of the second slot accommodation portion, and a width in the radial direction of the turn portion on the third slot accommodation portion side is smaller than a width in the radial direction of the third slot accommodation portion.

4. The rotating electric machine according to claim 2, wherein
the turn portion on the first slot accommodation portion side is positioned inward in the radial direction with respect to the first slot accommodation portion, the turn portion on the second slot accommodation portion side is positioned inward in the radial direction with respect to the second slot accommodation portion, the turn portion on the fourth slot accommodation portion side is positioned outward in the radial direction with respect to the fourth slot accommodation portion, and the turn portion on the third slot accommodation portion side is positioned outward in the radial direction with respect to the third slot accommodation portion.

5. The rotating electric machine according to claim 1, wherein
each unit coil includes a first slot accommodation portion for a first layer, a second slot accommodation portion for a second layer, a third slot accommodation portion for a third layer, a fourth slot accommodation portion for a fourth layer, a fifth slot accommodation portion for a fifth layer, and a sixth slot accommodation portion for a sixth layer,
each slot accommodation portion of the first to sixth slot accommodation portions is connected via the turn portion to another slot accommodation portion for a layer one-layer upper than the slot accommodation portion, and the first slot accommodation portion and the sixth slot accommodation portion are connected to the respective leg portions,
the first slot accommodation portion, the third slot accommodation portion, and the fifth slot accommodation portion are located at the same position in the circumferential direction, the second slot accommodation portion and the sixth slot accommodation portion are located at positions separated toward one side in the circumferential direction from the positions of the first and fifth slot accommodation portions by one magnetic pole pitch, and the fourth slot accommodation portion is located at a position separated toward another side in the circumferential direction from the position of the third slot accommodation portion by one magnetic pole pitch,
at a wire-connection-side coil end where there are a first-slot-accommodation-portion-side leg portion extending from the first slot accommodation portion and a sixth-slot-accommodation-portion-side leg portion extending from the sixth slot accommodation portion, a recess is formed in each of radially outer side surfaces at a bent part of the first-slot-accommodation-portion-side leg portion and a bent part of the turn portion extending from the third slot accommodation portion, and radially inner surfaces at a bent part of the turn portion extending from the second slot accommodation portion and a bent part of the turn portion extending from the fourth slot accommodation portion,
at a non-wire-connection-side coil end opposite to the wire-connection-side coil end in the axial direction, a recess is formed in each of radially outer side surfaces at a bent part of the turn portion extending from the second slot accommodation portion and a bent part of the turn portion extending from the fourth slot accommodation portion, and radially inner side surfaces at a bent part of the turn portion extending from the third slot accommodation portion and a bent part of the turn portion extending from the fifth slot accommodation portion.

6. The rotating electric machine according to claim 5, wherein
at the wire-connection-side coil end, widths in the radial direction of the turn portions extending from the second to fifth slot accommodation portions are smaller than widths in the radial direction of the respective second to fifth slot accommodation portions, and
at the non-wire-connection-side coil end, widths in the radial direction of the turn portions extending from the first to sixth slot accommodation portions are smaller than widths in the radial direction of the respective first to sixth slot accommodation portions.

7. The rotating electric machine according to claim 5, wherein
at the wire-connection-side coil end, the first-slot-accommodation-portion-side leg portion extending from the first slot accommodation portion is positioned inward in the radial direction with respect to the first slot accommodation portion, the turn portion extending from the second slot accommodation portion is positioned inward in the radial direction with respect to the second slot accommodation portion, the turn portion extending from the fifth slot accommodation portion is positioned outward in the radial direction with respect to the fifth slot accommodation portion, and the sixth-slot-accommodation-portion-side leg portion is positioned outward in the radial direction with respect to the sixth slot accommodation portion, and
at the non-wire-connection-side coil end, the turn portion extending from the first slot accommodation portion is positioned inward in the radial direction with respect to the first slot accommodation portion, and the turn portion extending from the sixth slot accommodation portion is positioned outward in the radial direction with respect to the sixth slot accommodation portion.

8. A method for manufacturing a rotating electric machine including an armature and a rotor,
the armature including an armature core and an armature winding formed by arranging a plurality of unit coils along a circumferential direction, the unit coil being formed by bending a conductive wire having an insulation coat, wherein
each unit coil includes: a plurality of slot accommodation portions located in different slots; a turn portion extending in a bent manner from each slot accommodation portion and connecting the slot accommodation portions to each other; and a leg portion extending in a bent manner from each slot accommodation portion, and
the plurality of slot accommodation portions are stacked in a radial direction in the slots, and recesses dented in the radial direction are formed in surfaces only opposed to each other at bent parts of a pair of turn portions or bent parts of the turn portion and the leg portion of slot accommodation portions adjacent to each other in the radial direction, that extend in a bent manner toward the same side in the circumferential direction,
the method comprising:
a step of forming a recess at a bending-planned part of the conductive wire, wherein
in the step of forming the recess,
a first die having an L shape at both end surfaces thereof is arranged such that two inner side surfaces thereof are in contact with two surfaces adjacent to each other at a bending-planned part of the conductive wire, and a second die having a projection for forming the recess is arranged so as to be opposed to one surface, of the conductive wire, that is not in contact with the first die, next, the second die is moved toward the first die so that the conductive wire is sandwiched and pressed between the first die and the second die, whereby the conductive wire is dented by the projection, and next, the second die is moved in a direction away from the first die, and the conductive wire in which the recess has been formed is extracted.

\* \* \* \* \*